US011395267B2

(12) United States Patent
Liu et al.

(10) Patent No.: US 11,395,267 B2
(45) Date of Patent: Jul. 19, 2022

(54) WIRELESS COMMUNICATION METHOD, TERMINAL DEVICE, AND NETWORK DEVICE

(71) Applicant: Huawei Technologies Co., Ltd., Shenzhen (CN)

(72) Inventors: Kunpeng Liu, Beijing (CN); Xueru Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 190 days.

(21) Appl. No.: 16/506,588

(22) Filed: Jul. 9, 2019

(65) Prior Publication Data

US 2019/0335443 A1  Oct. 31, 2019

Related U.S. Application Data

(63) Continuation of application No. PCT/CN2018/071501, filed on Jan. 5, 2018.

(30) Foreign Application Priority Data

Jan. 9, 2017 (CN) .......................... 201710013685.7

(51) Int. Cl.
*H04W 72/04* (2009.01)
*H04L 5/00* (2006.01)

(52) U.S. Cl.
CPC ....... *H04W 72/0406* (2013.01); *H04L 5/0048* (2013.01)

(58) Field of Classification Search
None
See application file for complete search history.

(56) References Cited

U.S. PATENT DOCUMENTS

2013/0194931 A1* 8/2013 Lee .................. H04W 72/04
370/241
2014/0293942 A1* 10/2014 Kang .................. H04L 5/0037
370/329

(Continued)

FOREIGN PATENT DOCUMENTS

CN 103945539 A 7/2014
CN 104349460 A 2/2015

(Continued)

OTHER PUBLICATIONS

"Remaining details of RS quasi co-location signaling," 3GPP TSG-RAN WG1 #70bis, San-Diego, USA, R1-124115, XP050662024, pp. 1-8, 3rd Generation Partnership Project, Valbonne, France (Oct. 8-13, 2012).

(Continued)

*Primary Examiner* — Mariela Vidal Carpio
(74) *Attorney, Agent, or Firm* — Leydig, Voit & Mayer, Ltd.

(57) ABSTRACT

This application provides a wireless communication method, a terminal device, and a network device. The method includes: determining, by a terminal device, a pilot signal corresponding to at least one of a plurality of search sections of a control channel; and detecting, by the terminal device, a control channel candidate in the at least one search section based on a quasi-co-location (QCL) association between the pilot signal corresponding to each search section and the demodulation pilot of the control channel candidate in each search section.

8 Claims, 12 Drawing Sheets

(56) References Cited

U.S. PATENT DOCUMENTS

| | | | |
|---|---|---|---|
| 2015/0117382 A1 | 4/2015 | Wang et al. | |
| 2015/0181568 A1* | 6/2015 | Seo | H04L 5/0053 370/329 |
| 2015/0215908 A1* | 7/2015 | Seo | H04L 5/0051 370/329 |
| 2015/0312927 A1* | 10/2015 | Ko | H04W 72/1231 370/336 |
| 2015/0334762 A1 | 11/2015 | Yang et al. | |
| 2016/0192331 A1 | 6/2016 | Liang et al. | |
| 2017/0195028 A1* | 7/2017 | Shimezawa | H04L 1/0026 |
| 2017/0347270 A1* | 11/2017 | Iouchi | H04W 72/0406 |
| 2018/0083680 A1* | 3/2018 | Guo | H04L 5/0007 |
| 2019/0215119 A1* | 7/2019 | Kim | H04L 1/06 |
| 2019/0215828 A1* | 7/2019 | Kim | H04W 48/08 |
| 2019/0306847 A1* | 10/2019 | Seo | H04L 5/0053 |
| 2019/0356524 A1* | 11/2019 | Yi | H04L 5/0094 |
| 2019/0394757 A1* | 12/2019 | Zhang | H04B 7/0456 |
| 2020/0059398 A1* | 2/2020 | Pan | H04L 5/0048 |
| 2020/0221427 A1* | 7/2020 | Nilsson | H04W 36/305 |
| 2020/0288482 A1* | 9/2020 | Yi | H04W 72/1289 |

FOREIGN PATENT DOCUMENTS

| | | |
|---|---|---|
| CN | 104904150 A | 9/2015 |
| EP | 3490184 A1 | 5/2019 |
| JP | 2015511447 A | 4/2015 |
| JP | 2015525519 A | 9/2015 |
| JP | 2015532050 A | 11/2015 |
| KR | 20140030072 A | 3/2014 |
| WO | 2013119091 A1 | 8/2013 |
| WO | 2013183943 A1 | 12/2013 |
| WO | 2014035217 A2 | 3/2014 |
| WO | 2014161141 A1 | 10/2014 |

OTHER PUBLICATIONS

"Principles for DL Reference Signal Design and QCL Assumptions," 3GPP TSG RAN WG1 Meeting #86b, Lisbon, Portugal, R1-1608816, XP051148870, pp. 1-6, 3rd Generation Partnership Project, Valbonne, France (Oct. 10-14, 2016).

"Discussion on RS Design and QCL Related Issues," 3GPP TSG-RAN WG1 #87, Reno, Nevada, R1-1612257, pp. 1-4, 3rd Generation Partnership Project, Valbonne, France (Nov. 14-18, 2016).

Huawei, HiSilicon, "DL Shared/group RS and UE-specific RS for control channel demodulation," 3GPP TSG RAN WG1 Meeting #87, Reno, USA, R1-1611243, total 4 pages, 3rd Generation Partnership Project, Valbonne, France (Nov. 14-18, 2016).

JP/2019-537121, Notice of Allowance, dated Apr. 6, 2021.

* cited by examiner

WIRELESS COMMUNICATION METHOD, TERMINAL DEVICE, AND NETWORK DEVICE

CROSS-REFERENCE TO RELATED APPLICATIONS

This application is a continuation of International Application No. PCT/CN2018/071501, filed on Jan. 5, 2018, which claims priority to Chinese Patent Application No. 201710013685.7, filed on Jan. 9, 2017. The disclosures of the aforementioned applications are hereby incorporated by reference in their entireties.

TECHNICAL FIELD

Embodiments of this application relate to the communications field, and more specifically, to a wireless communication method, a terminal device, and a network device.

BACKGROUND

A downlink control channel (Physical Downlink Control Channel, PDCCH) is used to carry downlink control information (DCI). The DCI may indicate, for each user, information specific to the user, for example, a time-frequency resource location at which downlink data of the user is placed or a transmission mode used for downlink data of the user, or may indicate some common information of all users, for example, system information, paging information, or a random access response.

A time-frequency resource location of downlink data of each user may be indicated by DCI carried on a PDCCH. However, no information indicates a location of the PDCCH. Therefore, each user needs to perform blind detection for the location of the PDCCH. A set of time-frequency resource locations at which the PDCCH may be placed is referred to as a search section. Each possible time-frequency resource location is referred to as a candidate in the search section. Each user detects all candidates in the search section. After the PDCCH of the user is detected, the user obtains the DCI of the user to obtain control information.

The search section may be classified into a communal search section and a user specific search section. DCI carried on a PDCCH in the communal search section is used to indicate common information of all users, as described in the first paragraph. DCI carried on a PDCCH in the user specific search section is used to indicate information specific to each user, as described in the first paragraph.

A quasi-co-location (quasi-co-located, QCL) association is used to associate at least two antenna ports. When two antenna ports are configured to have a QCL association, channels from the two ports to a same user have some same large-scale parameters, for example, a delay spread, a Doppler spread, a Doppler frequency shift, an average delay, an average channel angle of arrival, a channel angle of arrival spread, an average channel angle of departure, and a channel angle of departure spread. The foregoing parameters estimated by the user based on a reference signal on one of the ports can be used in a channel interpolation algorithm used when the user performs channel estimation on the other port by using a reference signal.

When performing blind detection on candidates in the communal search section and the user specific search section, the user needs to perform channel estimation by using a demodulation reference signal (DMRS) on a DMRS port of each candidate. Interpolation parameters (for example, the delay spread, the Doppler spread, the Doppler frequency shift, and the average delay) used in the channel estimation are obtained by measuring these parameters by a channel reference signal (CRS) port having a QCL association with the DMRS port. However, in a next-generation wireless communications system, because excessive time-frequency resources are occupied, a CRS reference signal is not supported. Therefore, ports whose reference signals have a QCL association with a DMRS port in a PDCCH cannot be learned. Consequently, proper channel estimation cannot be performed on the PDCCH, and DCI detection performance is degraded.

SUMMARY

Embodiments of this application provide a wireless communication method, a terminal device, and a network device. Different types of pilot signals have QCL associations with DMRSs in a communal search section of a downlink control channel and/or a user specific search section of a downlink control channel, to resolve a channel estimation issue during blind detection for the control channel.

According to a first aspect, a wireless communication method is provided, including: determining, by a terminal device, a pilot signal corresponding to at least one of a plurality of search sections of a control channel, where a pilot signal corresponding to each of the at least one search section has a quasi-co-location QCL association with a demodulation pilot of a control channel candidate in each search section, and different search sections in the plurality of search sections correspond to different types of pilot signals; and detecting, by the terminal device, a control channel candidate in the at least one search section based on the QCL association between the pilot signal corresponding to each search section and the demodulation pilot of the control channel candidate in each search section.

Optionally, the plurality of search sections of the control channel may be a communal search section and a user specific search section.

Therefore, in this embodiment of this application, demodulation pilots of control channel candidates in different search sections have quasi-co-location QCL associations with different types of pilot signals, and the terminal device detects a control channel candidate in the plurality of search sections by using a pilot signal that has a quasi-co-location QCL association with a demodulation pilot of a control channel candidate in each of the plurality of search sections, thereby resolving a channel estimation interpolation issue during blind detection for the control channel.

Optionally, in an implementation of the first aspect, the plurality of search sections include a communal search section, and a pilot signal corresponding to the communal search section is a pilot signal of a first type; and the pilot signal of the first type is at least one of the following signals: a synchronization signal, a demodulation pilot of a broadcast channel, and a beam measurement pilot.

Therefore, in this embodiment of this application, that a DMRS of a candidate in the communal search section of the control channel has a QCL association with the pilot signal of the first type (the synchronization signal, the demodulation pilot of the broadcast channel, and the beam measurement pilot) is defined, thereby resolving a channel estimation interpolation issue during blind detection on the candidate in the communal search section without a CRS.

Optionally, in an implementation of the first aspect, the method further includes:

sending, by the terminal device, a random access preamble to a network device; and receiving a random access response that is sent by the network device and that corresponds to the random access preamble, where the determining, by a terminal device, a pilot signal corresponding to at least one of a plurality of search sections of a control channel includes:

determining, as the pilot signal corresponding to the communal search section, a first pilot signal associated with the random access preamble sent by the terminal device, where the first pilot signal is a pilot signal of the first type.

Optionally, in an implementation of the first aspect, before the determining, as the pilot signal corresponding to the communal search section, a first pilot signal associated with the random access preamble sent by the terminal device, the method further includes:

determining, by the terminal device, the first pilot signal based on the random access preamble sent by the terminal device and a correspondence between a random access preamble and a pilot signal of the first type, where different random access preambles correspond to different sequences of pilot signals of the first type; or determining, by the terminal device, the first pilot signal based on the random access preamble sent by the terminal device and a correspondence between a random access preamble and a time-frequency resource of a pilot signal of the first type, where different random access preambles correspond to different time-frequency resources of pilot signals of the first type; or determining, by the terminal device, the first pilot signal based on a time-frequency resource of the random access preamble sent by the terminal device and a correspondence between a time-frequency resource of a random access preamble and a pilot signal of the first type, where the correspondence between a time-frequency resource of a random access preamble and a pilot signal of the first type is that different time-frequency resources of the random access preamble correspond to different sequences of pilot signals of the first type; or determining, by the terminal device, the first pilot signal based on a time-frequency resource of the random access preamble sent by the terminal device and a correspondence between a time-frequency resource of a random access preamble and a time-frequency resource of a pilot signal of the first type, where different time-frequency resources of the random access preamble correspond to different time-frequency resources of the first pilot signal.

Optionally, in an implementation of the first aspect, the method further includes:

listening to, by the terminal device, at least two different pilot signals of the first type; and selecting the first pilot signal from the at least two different pilot signals of the first type, where the random access preamble sent by the terminal device carries an identifier of the first pilot signal; and the determining, as the pilot signal corresponding to the communal search section, a first pilot signal associated with the random access preamble sent by the terminal device includes:

determining, by the terminal device based on the identifier of the first pilot signal, a first pilot signal having the identifier of the first pilot signal as the pilot signal corresponding to the communal search section.

Optionally, in an implementation of the first aspect, the at least two different pilot signals of the first type are sent by different transmit beams; and the determining, as the pilot signal corresponding to the communal search section, a first pilot signal associated with the random access preamble sent by the terminal device includes:

determining, by the terminal device based on the identifier of the first pilot signal, a pilot signal of the first type that is obtained through listening on a beam for sending the first pilot signal having the identifier, as the pilot signal corresponding to the communal search section.

Optionally, in an implementation of the first aspect, the terminal device determines that a beam for sending a first signal and a beam for sending a control channel candidate corresponding to the first signal are a same beam, where the first signal is a pilot signal of the first type; and the determining, by a terminal device, a pilot signal corresponding to each of a plurality of search sections of a control channel includes:

determining, as the pilot signal corresponding to the communal search section, the first signal that has a same transmit beam as the control channel candidate.

Optionally, in an implementation of the first aspect, the communal search section includes a control channel candidate for scheduling the random access response.

Optionally, in an implementation of the first aspect, the plurality of search sections include a user specific search section; and a pilot signal corresponding to the user specific search section is a pilot signal of a second type, and the pilot signal of the second type is a CSI-RS.

Therefore, in this embodiment of this application, that a DMRS of a candidate in the user specific search section of the control channel has a QCL association with the pilot signal of the second type (the CSI-RS) is defined, thereby resolving a channel estimation issue during blind detection by the terminal device on the candidate in the user specific search section without a CRS.

Optionally, in an implementation of the first aspect, the determining, by a terminal device, a pilot signal corresponding to at least one of a plurality of search sections of a control channel includes:

determining, based on a first correspondence between a total of M control channel candidates of the user specific search section and N transmit beams and a second correspondence between the N transmit beams and N pilot signals of the second type, pilot signals of the second type that respectively have QCL associations with the M control channel candidates, where M and N are integers greater than or equal to 2, where the first correspondence is determining, based on a beam identifier n of N beams, a resource location $\{C_i^n\}$, $0<i \le S^n$ of a control channel candidate set corresponding to the beam identifier n, $S^n$ is a quantity of control channel candidates corresponding to the beam identifier n, and $C_i^n$ is an identifier of an $i^{th}$ control channel candidate corresponding to the beam identifier n; and the second correspondence is sending the N pilot signals of the second type by using the N transmit beams, and pilot signals of the second type that are sent by using different transmit beams in the N transmit beams are different from each other.

Optionally, in an implementation of the first aspect, the determining, by a terminal device, a pilot signal corresponding to at least one of a plurality of search sections of a control channel includes:

determining, based on a third correspondence between a total of M control channel candidates of the user specific search section, N transmit beams, and an ID of the terminal device and a second correspondence between the N transmit beams and N pilot signals of the second type, pilot signals of the second type that respectively have QCL associations with the M control channel candidates, where M and N are integers greater than or equal to 2, where the second correspondence is sending the N pilot signals of the second type by using the N transmit beams, and pilot signals of the second type that are sent by using different transmit beams in the N transmit beams are different from each other; and the third correspondence is determining, jointly based on the beam identifier and ID information of the terminal device, a resource location $\{C_i^n\}$, $0<i \leq S''$ of a control channel candidate set corresponding to each beam, where $S''$ is a quantity of control channel candidates corresponding to the beam identifier n, and $C_i^n$ is an identifier of an $i^{th}$ control channel candidate corresponding to the beam identifier n.

Optionally, in an implementation of the first aspect, the determining, by a terminal device, a pilot signal corresponding to at least one of a plurality of search sections of a control channel includes:

determining, based on a fourth correspondence between a total of M control channel candidates of the user specific search section and N pilot signals of the second type, pilot signals of the second type that respectively have QCL associations with the M control channel candidates, where M and N are integers greater than or equal to 2, where the fourth correspondence is determining, based on an identifier n of the N pilot signals of the second type, a resource location $\{C_i^n\}$, $0<i \leq S''$ of a control channel candidate set corresponding to the identifier n, $S''$ is a quantity of control channel candidates corresponding to the identifier n of the pilot signal of the second type, and $C_i^n$ is an identifier of an $i^{th}$ control channel candidate corresponding to the identifier n of the pilot signal of the second type.

Optionally, in an implementation of the first aspect, $S''$ control channel candidates corresponding to a same beam in the N transmit beams have a QCL association with a same pilot signal of the second type, where a demodulation pilot of the $S''$ control channel candidates corresponding to the beam identifier n in the first correspondence has a QCL association with a pilot of the second type that is sent by using a beam corresponding to a beam n in the second correspondence; or a demodulation pilot of the $S''$ control channel candidates corresponding to the beam identifier n and the ID information of the terminal device in the third correspondence has a QCL association with a pilot of the second type that is sent by using a beam corresponding to a beam n in the second correspondence.

Optionally, in an implementation of the first aspect, the determining, by a terminal device, a pilot signal corresponding to at least one of a plurality of search sections of a control channel includes:

determining, based on a first correspondence between a total of M control channel candidates of the user specific search section and N beam pairs and a second correspondence between the N beam pairs and N pilot signals of the second type, pilot signals of the second type that respectively have QCL associations with the M control channel candidates, where M and N are integers greater than or equal to 2, where each of the N beam pairs includes a transmit beam and a receive beam, the transmit beam is a transmit beam of a network device, and the receive beam is a receive beam of the terminal device; and the first correspondence is determining, based on a beam pair identifier n of the N beam pairs, a resource location $\{C_i^n\}$, $0<i \leq S''$ of a control channel candidate set corresponding to the beam pair identifier n, $S''$ is a quantity of control channel candidates corresponding to the beam pair identifier n, and $C_i^n$ is an identifier of an $i^{th}$ control channel candidate corresponding to the beam pair identifier n; and the second correspondence is sending, by the network device, the N pilot signals of the second type by using transmit beams in the N beam pairs, and receiving, by the terminal device, the N pilot signals of the second type by using receive beams in the N beam pairs, where pilot signals of the second type that are sent and received by using different beam pairs in the N beam pairs are different from each other, and a beam for sending each pilot signal of the second type and a beam for receiving the pilot signal of the second type are respectively a transmit beam and a receive beam in a same beam pair.

Optionally, in an implementation of the first aspect, the determining, by a terminal device, a pilot signal corresponding to at least one of a plurality of search sections of a control channel includes:

determining, based on a third correspondence between a total of M control channel candidates of the user specific search section, N beam pairs, and an ID of the terminal device and a second correspondence between the N beam pairs and N pilot signals of the second type, pilot signals of the second type that respectively have QCL associations with the M control channel candidates, where M and N are integers greater than or equal to 2, where each of the N beam pairs includes a transmit beam and a receive beam, the transmit beam is a transmit beam of a network device, and the receive beam is a receive beam of the terminal device; and the second correspondence is sending, by the network device, the N pilot signals of the second type by using transmit beams in the N beam pairs, and receiving, by the terminal device, the N pilot signals of the second type by using receive beams in the N beam pairs, where pilot signals of the second type that are sent and received by using different beam pairs in the N beam pairs are different from each other, and a beam for sending each pilot signal of the second type and a beam for receiving the pilot signal of the second type are respectively a transmit beam and a receive beam in a same beam pair; and the third correspondence is determining, jointly based on the beam pair identifier and ID information of the terminal device, a resource location $\{C_i^n\}$, $0<i \leq S''$ of a control channel candidate set corresponding to each beam pair, where $S''$ is a quantity of control channel candidates corresponding to the beam pair identifier n, and $C_i^n$ is an identifier of an $i^{th}$ control channel candidate corresponding to the beam identifier n.

Optionally, in an implementation of the first aspect, $S''$ control channel candidates corresponding to a same beam pair in the N beam pairs have a QCL association with a same pilot signal of the second type, where a demodulation pilot of the $S''$ control channel candidates corresponding to the beam pair identifier n in the first correspondence has a QCL association with a pilot, corresponding to a beam pair n in the second correspondence, of the second type; or a demodulation pilot of the $S''$ control channel candidates corresponding to the beam pair identifier n and the ID information of the terminal device in the third correspondence has a QCL association with a pilot of the second type that is sent by using a beam corresponding to a beam pair n in the second correspondence.

Optionally, in an implementation of the first aspect, the method further includes:

receiving indication information that is sent by the network device by using higher layer signaling, where the indication information is used to indicate at least one type of the following information: beam identifiers of the N transmit beams, beam identifiers of the N beam pairs, and the fourth correspondence.

Optionally, in an implementation of the first aspect, the first correspondence and the third correspondence may be preset, and the terminal device may directly obtain the preset correspondences.

Therefore, in this embodiment of this application, the terminal device learns that the network device enables, through configuration, different user specific search sections to correspond to different transmit beams, and DMRSs of candidates in the different user specific search sections to have QCL associations with different CSI-RSs, thereby resolving a channel estimation issue during blind detection by the terminal device on a candidate in a user specific search section without a CRS.

According to a second aspect, a wireless communication method is provided, including: determining, by a network device, a pilot signal corresponding to at least one of a plurality of search sections of a control channel, where a pilot signal corresponding to each of the at least one search section has a quasi-co-location QCL association with a demodulation pilot of a control channel candidate in each search section, and different search sections in the plurality of search sections correspond to different types of pilot signals; and sending, by the network device, the pilot signal corresponding to the at least one of the plurality of search sections of the control channel.

Optionally, the plurality of search sections of the control channel may be a communal search section and a user specific search section.

Therefore, in this embodiment of this application, the network device enables, through configuration, demodulation pilots of control channel candidates in different search sections to have quasi-co-location QCL associations with different types of pilot signals.

Optionally, in an implementation of the second aspect, the plurality of search sections include the communal search section, and a pilot signal corresponding to the communal search section is a pilot signal of a first type; and the pilot signal of the first type is at least one of the following signals: a synchronization signal, a demodulation pilot of a broadcast channel, and a beam measurement pilot.

Therefore, in this embodiment of this application, that a DMRS of a candidate in the communal search section of the control channel has a QCL association with the pilot signal of the first type (the synchronization signal, the demodulation pilot of the broadcast channel, and the beam measurement pilot) is defined, thereby resolving a channel estimation issue during blind detection on the candidate in the communal search section without a CRS.

Optionally, in an implementation of the second aspect, the method further includes:

receiving, by the network device, a random access preamble sent by a terminal device; and sending, by the network device, a random access response corresponding to the random access preamble to the terminal device, where the determining, by a network device, a pilot signal corresponding to at least one of a plurality of search sections of a control channel includes:

determining, as the pilot signal corresponding to the communal search section, a first pilot signal associated with the random access preamble received by the network device, where the first pilot signal is a pilot signal of the first type.

Optionally, in an implementation of the second aspect, before the determining, as the pilot signal corresponding to the communal search section, a first pilot signal associated with the random access preamble received by the network device, the method further includes:

determining, by the network device, the first pilot signal based on the random access preamble received by the network device and a correspondence between a random access preamble and a pilot signal of the first type, where different random access preambles correspond to different sequences of pilot signals of the first type; or determining, by the terminal device, the first pilot signal based on the random access preamble sent by the terminal device and a correspondence between a random access preamble and a time-frequency resource of a pilot signal of the first type, where different random access preambles correspond to different time-frequency resources of pilot signals of the first type; or determining, by the network device, the first pilot signal based on a time-frequency resource of the random access preamble received by the network device and a correspondence between a time-frequency resource of a random access preamble and a pilot signal of the first type, where the correspondence between a time-frequency resource of a random access preamble and a pilot signal of the first type is that different time-frequency resources of the random access preamble correspond to different sequences of pilot signals of the first type; or determining, by the network device, the first pilot signal based on a time-frequency resource of the random access preamble received by the network device and a correspondence between a time-frequency resource of a random access preamble and a time-frequency resource of a pilot signal of the first type, where different time-frequency resources of the random access preamble correspond to different time-frequency resources of the first pilot signal.

Optionally, in an implementation of the second aspect, the method further includes:

sending, by the network device, at least two different pilot signals of the first type; and selecting the first pilot signal from the at least two different pilot signals of the first type, where the random access preamble received by the network device carries an identifier of the first pilot signal; and the determining, as the pilot signal corresponding to the communal search section, a first pilot signal associated with the random access preamble received by the network device includes:

determining, by the network device based on the identifier of the first pilot signal, a first pilot signal having the identifier as the pilot signal corresponding to the communal search section.

Optionally, in an implementation of the second aspect, the at least two different pilot signals of the first type are sent by different transmit beams; and the determining, as the pilot signal corresponding to the communal search section, a first pilot signal associated with the random access preamble received by the network device includes:

determining, by the network device based on the identifier of the first pilot signal, a pilot signal of the first type that is obtained through listening on a beam for sending the first pilot signal having the identifier, as the pilot signal corresponding to the communal search section.

Optionally, in an implementation of the second aspect, the network device determines that a beam for sending a first signal and a beam for sending a control channel candidate corresponding to the first signal are a same beam, where the first signal is a pilot signal of the first type; and the determining, by a network device, a pilot signal corresponding to each of a plurality of search sections of a control channel includes:

determining, as the pilot signal corresponding to the communal search section, the first signal that has a same transmit beam as the control channel candidate.

Optionally, in an implementation of the second aspect, the communal search section includes a control channel candidate for scheduling the random access response.

Optionally, in an implementation of the second aspect, the plurality of search sections include a user specific search section; and a pilot signal corresponding to the user specific search section is a pilot signal of a second type, and the pilot signal of the second type is a CSI-RS.

Therefore, in this embodiment of this application, that a DMRS of a candidate in the user specific search section of the control channel has a QCL association with the pilot signal of the second type (the CSI-RS) is defined, thereby resolving a channel estimation issue during blind detection by the terminal device on the candidate in the user specific search section without a CRS.

Optionally, in an implementation of the second aspect, the determining, by a network device, a pilot signal corresponding to at least one of a plurality of search sections of a control channel includes:

determining, based on a first correspondence between a total of M control channel candidates of the user specific search section and N transmit beams and a second correspondence between the N transmit beams and N pilot signals of the second type, pilot signals of the second type that respectively have QCL associations with the M control channel candidates, where M and N are integers greater than or equal to 2, where the first correspondence is determining, based on a beam identifier n of N beams, a resource location $\{C_i^n\}$, $0 < i \leq S^n$ of a control channel candidate set corresponding to the beam identifier n, $S^n$ is a quantity of control channel candidates corresponding to the beam identifier n, and $C_i^n$ is an identifier of an $i^{th}$ control channel candidate corresponding to the beam identifier n; and the second correspondence is sending the N pilot signals of the second type by using the N transmit beams, and pilot signals of the second type that are sent by using different transmit beams in the N transmit beams are different from each other.

Optionally, in an implementation of the second aspect, the determining, by a network device, a pilot signal corresponding to at least one of a plurality of search sections of a control channel includes:

determining, based on a third correspondence between a total of M control channel candidates of the user specific search section, N transmit beams, and an ID of the terminal device and a second correspondence between the N transmit beams and N pilot signals of the second type, pilot signals of the second type that respectively have QCL associations with the M control channel candidates, where M and N are integers greater than or equal to 2, where the second correspondence is sending the N pilot signals of the second type by using the N transmit beams, and pilot signals of the second type that are sent by using different transmit beams in the N transmit beams are different from each other; and the third correspondence is determining, jointly based on the beam identifier and ID information of the terminal device, a resource location $\{C_i^n\}$, $0 < i \leq S^n$ of a control channel candidate set corresponding to each beam, where $S^n$ is a quantity of control channel candidates corresponding to the beam identifier n, and $C_i^n$ is an identifier of an $i^{th}$ control channel candidate corresponding to the beam identifier n.

Optionally, in an implementation of the second aspect, the determining, by a network device, a pilot signal corresponding to at least one of a plurality of search sections of a control channel includes:

determining, based on a fourth correspondence between a total of M control channel candidates of the user specific search section and N pilot signals of the second type, pilot signals of the second type that respectively have QCL associations with the M control channel candidates, where M and N are integers greater than or equal to 2, where the fourth correspondence is determining, based on an identifier n of the N pilot signals of the second type, a resource location $\{C_i^n\}$, $0 < i \leq S^n$ of a control channel candidate set corresponding to the identifier n, $S^n$ is a quantity of control channel candidates corresponding to the identifier n of the pilot signal of the second type, and $C_i^n$ is an identifier of an $i^{th}$ control channel candidate corresponding to the identifier n of the pilot signal of the second type.

Optionally, in an implementation of the second aspect, $S^n$ control channel candidates corresponding to a same beam in the N transmit beams have a QCL association with a same pilot signal of the second type, where a demodulation pilot of the $S^n$ control channel candidates corresponding to the beam identifier n in the first correspondence has a QCL association with a pilot of the second type that is sent by using a beam corresponding to a beam n in the second correspondence; or a demodulation pilot of the $S^n$ control channel candidates corresponding to the beam identifier n and the ID information of the terminal device in the third correspondence has a QCL association with a pilot of the second type that is sent by using a beam corresponding to a beam n in the second correspondence.

Optionally, in an implementation of the second aspect, the determining, by a network device, a pilot signal corresponding to at least one of a plurality of search sections of a control channel includes:

determining, based on a first correspondence between a total of M control channel candidates of the user specific search section and N beam pairs and a second correspondence between the N beam pairs and N pilot signals of the second type, pilot signals of the second type that respectively have QCL associations with the M control channel candidates, where M and N are integers greater than or equal to 2, where each of the N beam pairs includes a transmit beam and a receive beam, the transmit beam is a transmit beam of the network device, and the receive beam is a receive beam of a terminal device; and the first correspondence is determining, based on a beam pair identifier n of the N beam pairs, a resource location $\{C_i^n\}$, $0 < i \leq S^n$ of a control channel candidate set corresponding to the beam pair identifier n, $S^n$ is a quantity of control channel candidates corresponding to the beam pair identifier n, and $C_i^n$ is an identifier of an $i^{th}$ control channel candidate corresponding to the beam pair identifier n; and the second correspondence is sending, by the network device, the N pilot signals of the second type by using transmit beams in the N beam pairs, and receiving, by the terminal device, the N pilot signals of the second type by using receive beams in the N beam pairs, where pilot signals of the second type that are sent and received by using different beam pairs in the N beam pairs are different from each other, and a beam for sending each pilot signal of the second type and a beam for receiving the pilot signal of the second type are respectively a transmit beam and a receive beam in a same beam pair.

Optionally, in an implementation of the second aspect, the determining, by a network device, a pilot signal corresponding to at least one of a plurality of search sections of a control channel includes:

determining, based on a third correspondence between a total of M control channel candidates of the user specific search section, N beam pairs, and an ID of the terminal device and a second correspondence between the N beam pairs and N pilot signals of the second type, pilot signals of the second type that respectively have QCL associations with the M control channel candidates, where M and N are integers greater than or equal to 2, where each of the N beam pairs includes a transmit beam and a receive beam, the transmit beam is a transmit beam of the network device, and the receive beam is a receive beam of the terminal device; and the second correspondence is sending, by the network device, the N pilot signals of the second type by using transmit beams in the N beam pairs, and receiving, by the terminal device, the N pilot signals of the second type by using receive beams in the N beam pairs, where pilot signals of the second type that are sent and received by using different beam pairs in the N beam pairs are different from each other, and a beam for sending each pilot signal of the second type and a beam for receiving the pilot signal of the second type are respectively a transmit beam and a receive beam in a same beam pair; and the third correspondence is determining, jointly based on the beam pair identifier and ID information of the terminal device, a resource location $\{C_i^n\}$, $0 \leq i \leq S^n$ of a control channel candidate set corresponding to each beam pair, where $S^n$ is a quantity of control channel candidates corresponding to the beam pair identifier n, and $C_i^n$ is an identifier of an $i^{th}$ control channel candidate corresponding to the beam identifier n.

Optionally, in an implementation of the second aspect, $S^n$ control channel candidates corresponding to a same beam pair in the N beam pairs have a QCL association with a same pilot signal of the second type, where a demodulation pilot of the $S^n$ control channel candidates corresponding to the beam pair identifier n in the first correspondence has a QCL association with a pilot, corresponding to a beam pair n in the second correspondence, of the second type; or a demodulation pilot of the $S^n$ control channel candidates corresponding to the beam pair identifier n and the ID information of the terminal device in the third correspondence has a QCL association with a pilot of the second type that is sent by using a beam corresponding to a beam pair n in the second correspondence.

Optionally, in an implementation of the second aspect, the method further includes:

sending, by the network device, indication information by using higher layer signaling, where the indication information is used to indicate at least one type of the following information: beam identifiers of the N transmit beams, beam identifiers of the N beam pairs, the second correspondence, and the fourth correspondence.

Optionally, in an implementation of the second aspect, the first correspondence and the third correspondence may be preset, and the terminal device may directly obtain the preset correspondences.

Therefore, in this embodiment of this application, the network device enables, through configuration, different user specific search sections to correspond to different transmit beams, and DMRSs of candidates in the different user specific search sections to have QCL associations with different CSI-RSs, so that the terminal device can perform blind detection in the plurality of user specific search sections without a CRS, thereby resolving a channel estimation issue during blind detection for the control channel.

According to a third aspect, an embodiment of this application provides a terminal device, including a module or a unit that can perform the method in the first aspect or any optional implementation of the first aspect.

According to a fourth aspect, an embodiment of this application provides a network device, including a module or a unit that can perform the method in the second aspect or any optional implementation of the second aspect.

According to a fifth aspect, a wireless communications device is provided, including: a memory, a transceiver, and a processor. The memory stores program code that can be used to instruct to perform the method in the first aspect or any optional implementation of the first aspect. When the code is executed, the processor can implement operations performed by a receive end device in the method.

According to a sixth aspect, a wireless communications device is provided, including: a memory, a transceiver, and a processor. The memory stores program code that can be used to instruct to perform the method in the second aspect or any optional implementation of the second aspect. When the code is executed, the processor can implement operations performed by a transmit end device in the method.

According to a seventh aspect, a computer storage medium is provided. The computer storage medium stores program code, and the program code can be used to instruct to perform the method in the first aspect or any optional implementation of the first aspect.

According to an eighth aspect, a computer storage medium is provided. The computer storage medium stores program code, and the program code can be used to instruct to perform the method in the second aspect or any optional implementation of the second aspect.

DESCRIPTION OF EMBODIMENTS

The following describes technical solutions in this application with reference to the accompanying drawings.

Figure 1:
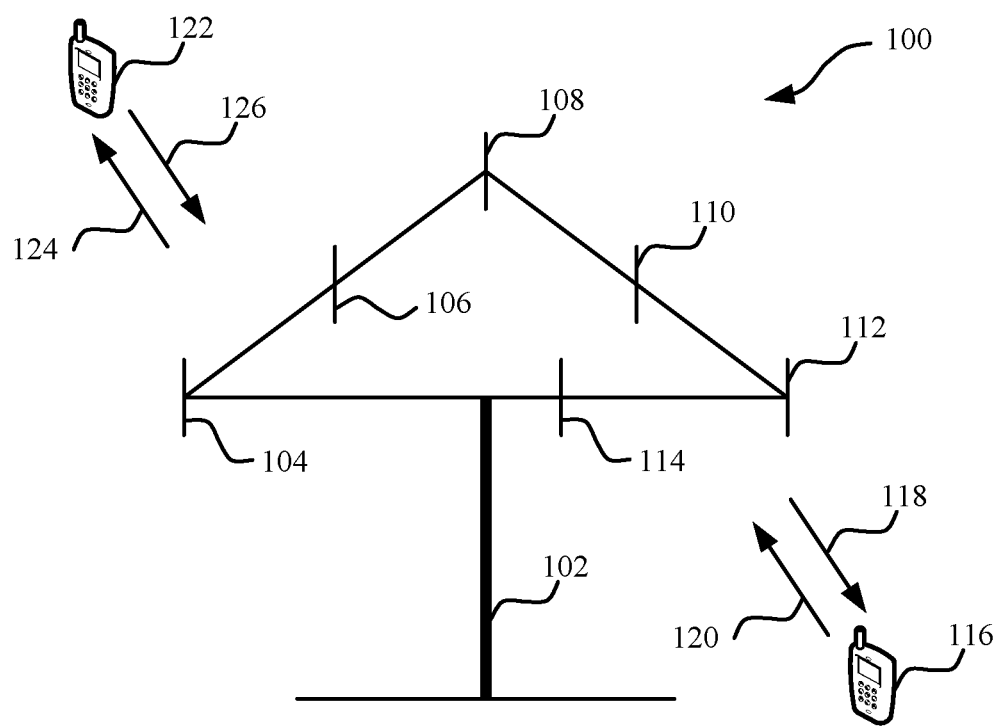
FIG. 1 is a schematic diagram of a communications system using wireless communication according to this application.

FIG. 1 is a schematic diagram of a communications system using wireless communication according to this application. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that, the transmitter chain may be a transmit system or a transmitter, the receiver chain may be a receive system or a receiver, the transmitter chain and the receiver chain may each include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that, the network device 102 may communicate with any quantity of terminal devices similar to the terminal device 116 or 122. The terminal devices 116 and 122 each may be, for example, a cellular phone, a smartphone, a portable computer, a handheld communications device, a handheld computing device, a satellite radio apparatus, a Global Positioning System, a PDA, and/or any other proper device used for communication in the wireless communications system 100.

As shown in FIG. 1, the terminal device 116 communicates with the antennas 112 and 114. The antennas 112 and 114 send information to the terminal device 116 over a forward link 118, and receive information from the terminal device 116 over a reverse link 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (FDD) system, the forward link 118 may use a band different from that used by the reverse link 120, and the forward link 124 may use a band different from that used by the reverse link 126.

For another example, in a time division duplex (TDD) system and a full-duplex system, the forward link 118 and the reverse link 120 may use a same band, and the forward link 124 and the reverse link 126 may use a same band.

Each antenna (or antenna group including a plurality of antennas) or each area or both that are designed for communication are referred to as a sector of the network device 102. For example, an antenna group may be designed to communicate with a terminal device in a sector of a coverage area of the network device 102. When the network device 102 communicates with the terminal devices 116 and 122 over the forward links 118 and 124 respectively, transmit antennas of the network device 102 may improve signal-to-noise ratios of the forward links 118 and 124 through beamforming. In addition, compared with a manner in which a network device sends signals to all terminal devices of the network device by using a single antenna, a manner in which the network device 102 sends, through beamforming, signals to the terminal devices 116 and 122 that are randomly scattered in a related coverage area causes less interference to a mobile device in a neighboring cell.

Within a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, by generating, receiving from another communications apparatus, or storing in a memory) a particular quantity of data bits that need to be sent to a wireless communications receiving apparatus through a channel. The data bits may be included in a transport block (or a plurality of transport blocks) of data, and the transport block may be segmented to generate a plurality of code blocks.

In addition, the communications system 100 may be a public land mobile network (PLMN), a device-to-device (D2D) network, a machine-to-machine (M2M) network, or another network. FIG. 1 is merely an example of a simplified schematic diagram. The network may further include another network device not shown in FIG. 1.

A transmit end in the embodiments of this application may be a network device. The network device may be a device communicating with a terminal device, for example, a network device or a network device controller. Each network device can provide communication coverage for a particular geographic area, and can communicate with a terminal device within the coverage area (a cell). The network device may be a network device (for example, a base transceiver station (BTS)) in a Global System for Mobile Communications (GSM) or a Code Division Multiple Access (CDMA) system, or may be a network device (NodeB, NB) in a Wideband Code Division Multiple Access (WCDMA) system, or may be an evolved network device (Evolved NodeB, eNB or eNodeB) in an LTE system, or a radio controller in a cloud radio access network (CRAN), or the network device may be a network device in a future 5G network, a network device in a future evolved public land mobile network (PLMN), or the like.

A receive end in the embodiments of this application may be a terminal device. The terminal device may be an access terminal, a user equipment (UE), a subscriber unit, a subscriber station, a mobile station, a remote station, a remote terminal, a mobile terminal, a user terminal, a terminal, a wireless communications device, a user agent, or a user apparatus. The access terminal may be a cellular phone, a cordless telephone set, a Session Initiation Protocol (SIP) phone, a wireless local loop (WLL) station, a personal digital assistant (PDA), a handheld device having a wireless communication function, a computing device or another processing device connected to a wireless modem, an invehicle device, a wearable device, a terminal device in the Internet of Things, a virtual reality device, a terminal device in a future 5G network, a terminal device in a future evolved public land mobile network (PLMN), or the like.

A wireless communication method provided in the embodiments of this application may be applied to a terminal device or a network device. The terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more of computer operating systems that implement service processing by using a process, for example, a Linux operating system, a Unix operating system, an Android operating system, an iOS operating system, or a Windows operating system. The application layer includes applications such as a browser, an address book, text processing software, and instant messaging software. In addition, in the embodiments of this application, a specific structure of an entity for performing the wireless communication method is not particularly limited in this application, provided that the entity can run a program that records code of the wireless communication method in the embodiments of this application, to perform communication according to the wireless communication method in the embodiments of this application. For example, the wireless communication method in the embodiments of this application may be performed by a terminal device, a network device, or a functional module that is in a terminal device or a network device and that can invoke and execute the program.

Figure 2:
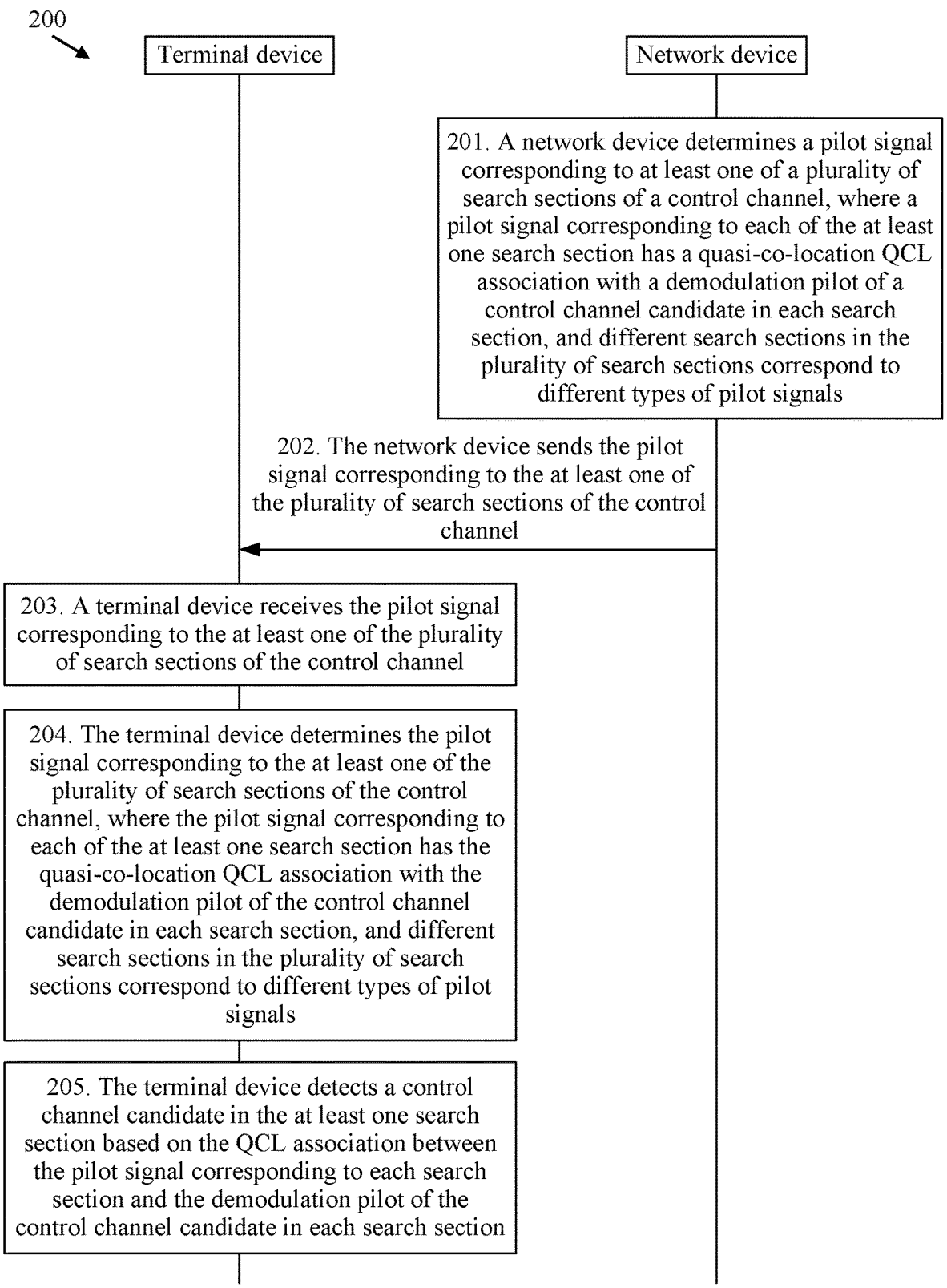
FIG. 2 is a schematic flowchart of a wireless communication method according to an embodiment of this application.

FIG. 2 is a schematic flowchart of a wireless communication method 200 according to an embodiment of this application. As shown in FIG. 2, the method 200 includes the following content.

201. A network device determines a pilot signal corresponding to at least one of a plurality of search sections of a control channel, where a pilot signal corresponding to each of the at least one search section has a quasi-co-location QCL association with a demodulation pilot of a control channel candidate in each search section, and different search sections in the plurality of search sections correspond to different types of pilot signals.

Optionally, the plurality of search sections of the control channel may be a communal search section and a user specific search section.

Optionally, a pilot signal corresponding to the communal search section and a pilot signal corresponding to the user specific search section are different types of pilot signals.

Optionally, the pilot signal corresponding to the communal search section has a QCL association with a demodulation pilot of a control channel candidate in the communal search section.

Optionally, the pilot signal corresponding to the user specific search section has a QCL association with a demodulation pilot of a control channel candidate in the user specific search section.

Optionally, the network device may determine only the pilot signal corresponding to the communal search section in the plurality of search sections.

Optionally, the network device may determine only the pilot signal corresponding to the user specific search section in the plurality of search sections.

Optionally, the pilot signal corresponding to the communal search section is a pilot signal of a first type.

Optionally, the pilot signal of the first type is at least one of the following signals: a synchronization signal, a demodulation pilot of a broadcast channel, and a beam measurement pilot.

Optionally, the beam measurement pilot may be used to measure received energy or received power of a beam, or may be used to measure other information of the beam. This is not specifically limited in this embodiment of this application.

Optionally, the pilot signal corresponding to the user specific search section is a pilot signal of a second type, and the pilot signal of the second type is a channel state information-reference signal (CSI-RS).

202. The network device sends the pilot signal corresponding to the at least one of the plurality of search sections of the control channel.

Optionally, the at least one search section may be the communal search section, or may be the user specific search section, or may include both the communal search section and the user specific search section.

Optionally, the network device may send, on different orthogonal frequency division multiplexing (OFDM) symbols through time division multiplexing by using different beams, the pilot signal corresponding to the at least one search section.

Optionally, the network device may alternatively send, on different subcarriers in a same OFDM symbol through frequency division multiplexing by using different beams, the pilot signal corresponding to the at least one search section.

Optionally, the network device may alternatively send, in a manner of combination of time division multiplexing and frequency division multiplexing, the pilot signal corresponding to the at least one search section.

Optionally, the network device may send, by using a plurality of beams, the pilot signal corresponding to the at least one search section.

Optionally, different transmit beams in the plurality of beams correspond to different precoding matrices, and different beams occupy different time-frequency resources.

Optionally, the network device may calculate all candidates in the communal search section by using an identifier of a transmit beam. Optionally, a calculation manner may be configured by a higher layer, or may be predefined.

203. A terminal device receives the pilot signal corresponding to the at least one of the plurality of search sections of the control channel.

Optionally, the at least one search section may be the communal search section, or may be the user specific search section, or may include both the communal search section and the user specific search section.

Optionally, the terminal device may listen to a pilot signal of the first type on a time-frequency resource occupied by each of the plurality of beams.

Optionally, the terminal device may detect power of a pilot signal of the first type that is sent by each beam to determine a selected beam.

Optionally, the terminal device measures a pilot signal of the first type on the selected beam, to obtain a delay spread, a Doppler spread, a Doppler frequency shift, an average delay, or the like of the pilot signal of the first type that is sent on the beam, so that the terminal device may estimate a delay spread, a Doppler spread, a Doppler frequency shift, an average delay, or the like of a channel corresponding to the beam.

Optionally, the terminal device may alternatively calculate all candidates in the communal search section by using an identifier of the selected beam. Optionally, a calculation manner may be configured by a higher layer, or may be predefined.

Optionally, the identifier of the selected beam may be a number of the beam.

204. The terminal device determines the pilot signal corresponding to the at least one of the plurality of search sections of the control channel, where the pilot signal corresponding to each of the at least one search section has the QCL association with the demodulation pilot of the control channel candidate in each search section, and different search sections in the plurality of search sections correspond to different types of pilot signals.

205. The terminal device detects a control channel candidate in the at least one search section based on the QCL association between the pilot signal corresponding to each search section and the demodulation pilot of the control channel candidate in each search section.

The terminal device measures the pilot signal corresponding to each search section, to obtain a delay spread, a Doppler spread, a Doppler frequency shift, an average delay, or the like of the pilot signal corresponding to each search section, so that the terminal device may perform channel interpolation on the demodulation pilot of the control channel candidate in each search section based on a parameter such as the delay spread, the Doppler spread, the Doppler frequency shift, or the average delay, and detect the control channel candidate in the search section.

Figure 3A:
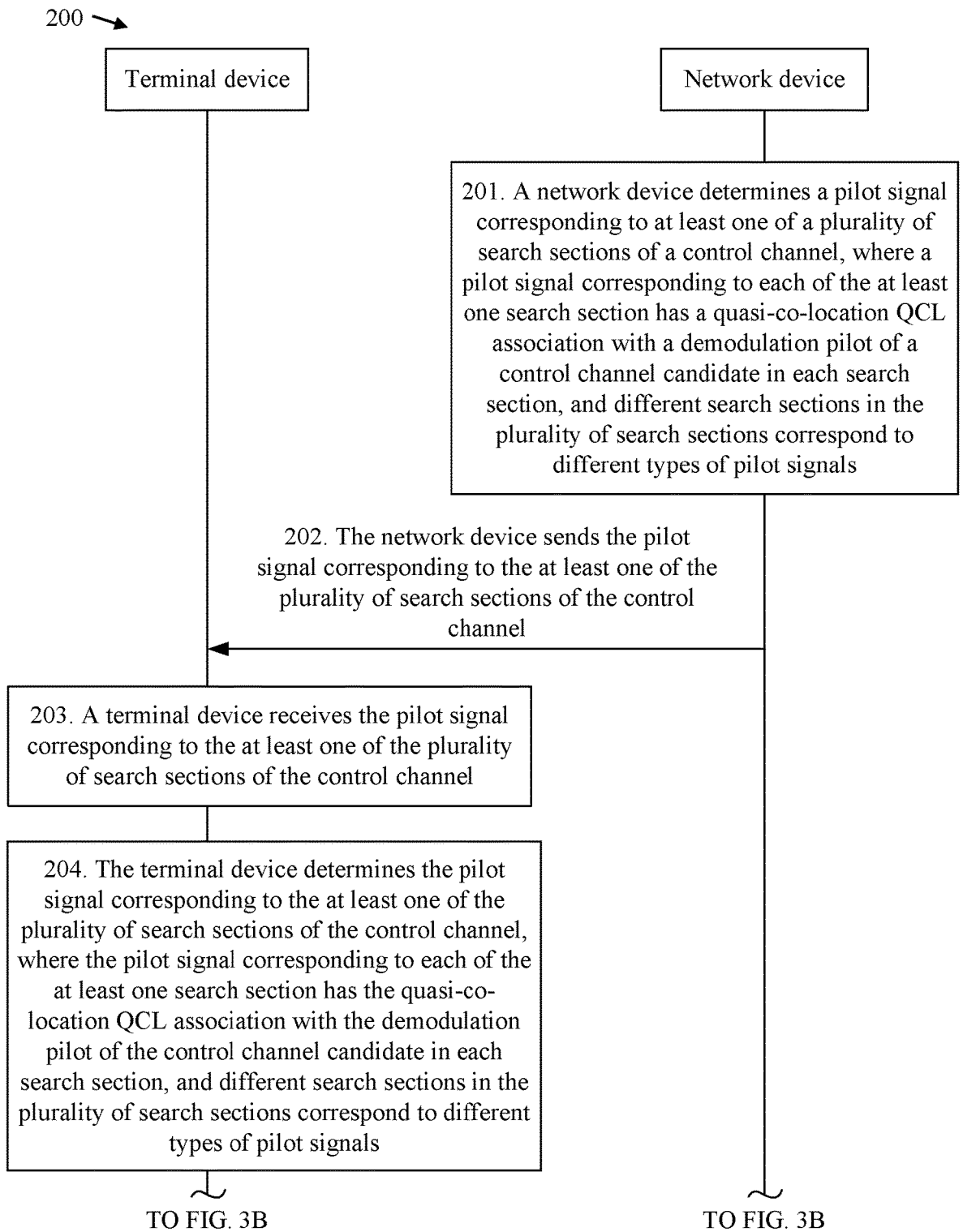
FIG. 3A and FIG. 3B are a schematic flowchart of a wireless communication method according to another embodiment of this application.
Figure 3B:
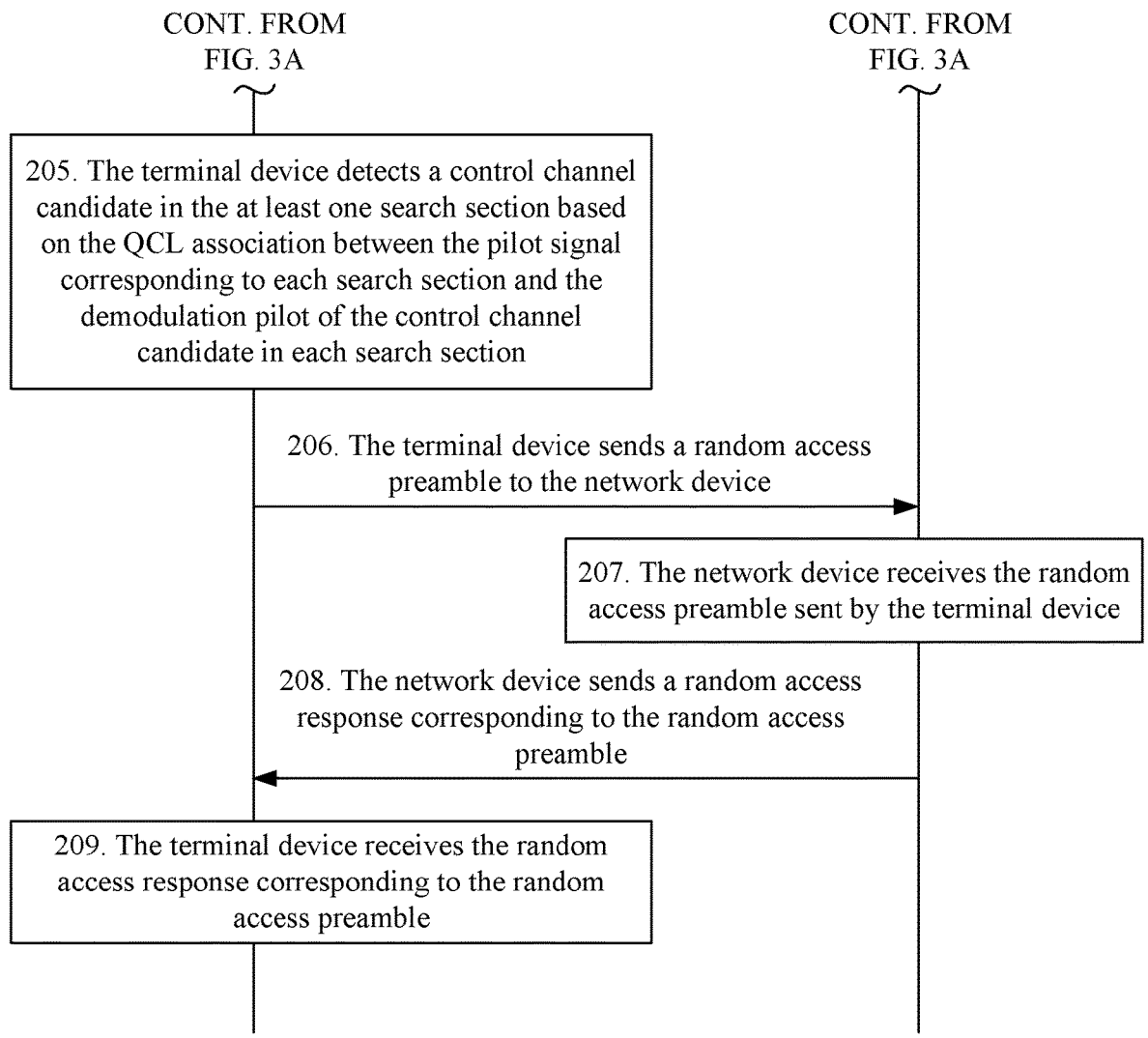

Optionally, in an embodiment, as shown in FIG. 3A and FIG. 3B, the method 200 may further include the following content.

206. The terminal device sends a random access preamble to the network device.

Optionally, after determining the selected beam, the terminal device sends a random access request to the network device. The random access request includes the random access preamble.

Optionally, the terminal device sends the random access preamble to the network device through an uplink random access channel.

Optionally, the random access preamble is associated with the selected beam.

207. The network device receives the random access preamble sent by the terminal device.

208. The network device sends a random access response corresponding to the random access preamble.

After detecting the random access request of the terminal device and determining, based on an association method for the detected random access preamble and a pilot signal of the first type, the beam that is used by the network device to send the pilot signal of the first type and that is selected by the terminal device, the network device selects a candidate in the communal search section of a PDCCH, schedules the response to the random access request of the terminal device by using DCI of the candidate, and sends the candidate by using the determined beam selected by the terminal device.

209. The terminal device receives the random access response corresponding to the random access preamble.

Optionally, the pilot signal of the first type that performs this embodiment may be a first pilot signal, and the first pilot signal is a pilot signal of the first type.

Optionally, the first pilot signal associated with the random access preamble sent by the terminal device is determined as the pilot signal corresponding to the communal search section. The first pilot signal is a pilot signal of the first type, and may be a downlink synchronization signal, or may be a demodulation pilot of a broadcast channel, or may be a beam measurement pilot.

Optionally, the communal search section includes a control channel candidate for scheduling the random access response.

Optionally, the network device determines that a beam for sending a first signal and a beam for sending a control channel candidate corresponding to the first signal are a same beam, where the first signal is a pilot signal of the first type.

The determining, by a network device, a pilot signal corresponding to each of a plurality of search sections of a control channel includes:

determining, as the pilot signal corresponding to the communal search section, the first signal that has a same transmit beam as the control channel candidate.

Figure 4:
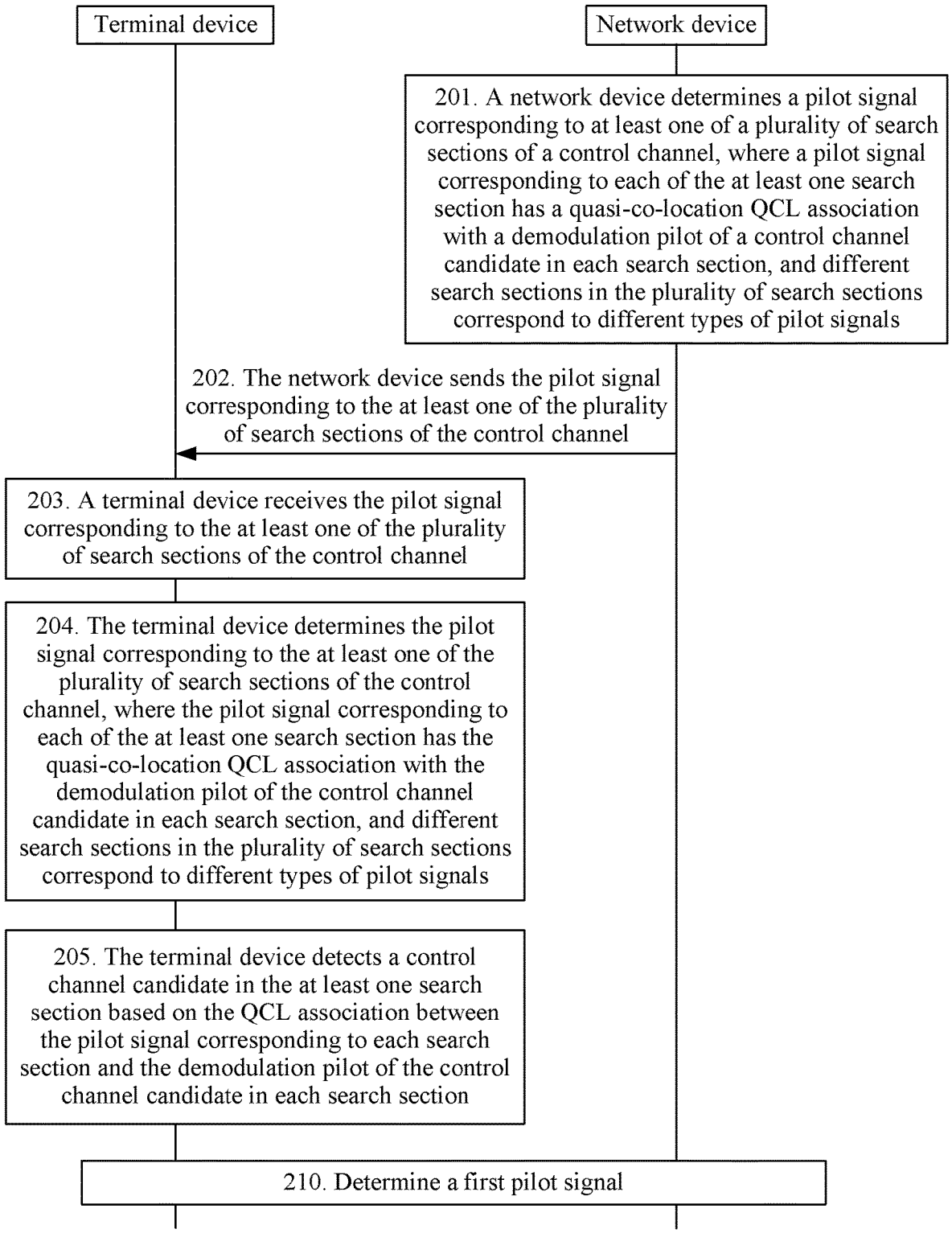
FIG. 4 is a schematic flowchart of a wireless communication method according to still another embodiment of this application.

Optionally, in an embodiment, as shown in FIG. 4, the method 200 may further include the following content.

210. Determine a first pilot signal.

Optionally, the first pilot signal is a pilot signal of the first type, and may be a downlink synchronization signal, or may be a demodulation pilot of a broadcast channel, or may be a beam measurement pilot.

Optionally, the terminal device may determine the first pilot signal, or the network device may determine the first pilot signal.

Optionally, the first pilot signal is determined before the first pilot signal associated with the random access preamble sent by the terminal device is determined as the pilot signal corresponding to the communal search section.

Optionally, the terminal device determines the first pilot signal based on the random access preamble sent by the terminal device and a correspondence between a random access preamble and a pilot signal of the first type. Different random access preambles correspond to different pilot signals of the first type. Optionally, a pilot signal, corresponding to the random access preamble sent by the terminal device, of the first type is determined as the first pilot signal.

Optionally, the terminal device determines the first pilot signal based on the random access preamble sent by the terminal device and a correspondence between a random access preamble and a time-frequency resource of a pilot signal of the first type. Different random access preambles correspond to different time-frequency resources of pilot signals of the first type. Optionally, a pilot signal sent on a time-frequency resource, corresponding to the random access preamble sent by the terminal device, of a pilot signal of the first type is determined as the first pilot signal.

Optionally, the terminal device determines the first pilot signal based on a time-frequency resource of the random access preamble sent by the terminal device and a correspondence between a time-frequency resource of a random access preamble and a pilot signal of the first type. The correspondence between a time-frequency resource of a random access preamble and a pilot signal of the first type is that different time-frequency resources of the random access preamble correspond to different sequences of pilot signals of the first type. Optionally, a pilot signal, corresponding to the time-frequency resource of the random access preamble sent by the terminal device, of the first type is determined as the first pilot signal.

Optionally, the terminal device determines the first pilot signal based on a time-frequency resource of the random access preamble sent by the terminal device and a correspondence between a time-frequency resource of a random access preamble and a time-frequency resource of a pilot signal of the first type. Different time-frequency resources of the random access preamble correspond to different time-frequency resources of the first pilot signal. Optionally, a pilot signal on a time-frequency resource corresponding to the time-frequency resource of the random access preamble sent by the terminal device is determined as the first pilot signal.

Optionally, the foregoing solutions in this embodiment are specifically described by using the terminal device as an execution body, and also applicable to the network device.

Figure 5A:
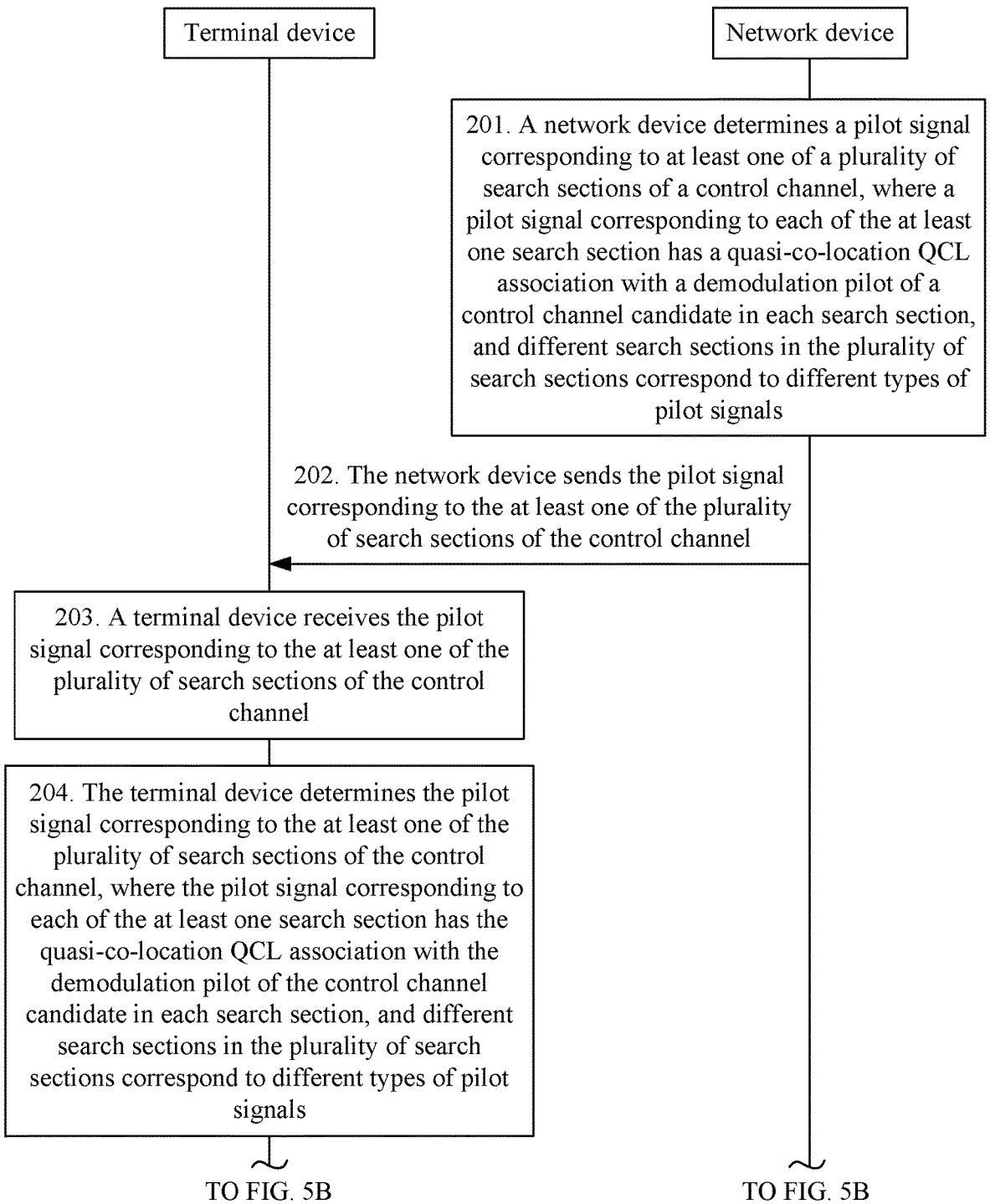
FIG. 5A and FIG. 5B are a schematic flowchart of a wireless communication method according to still another embodiment of this application.
Figure 5B:
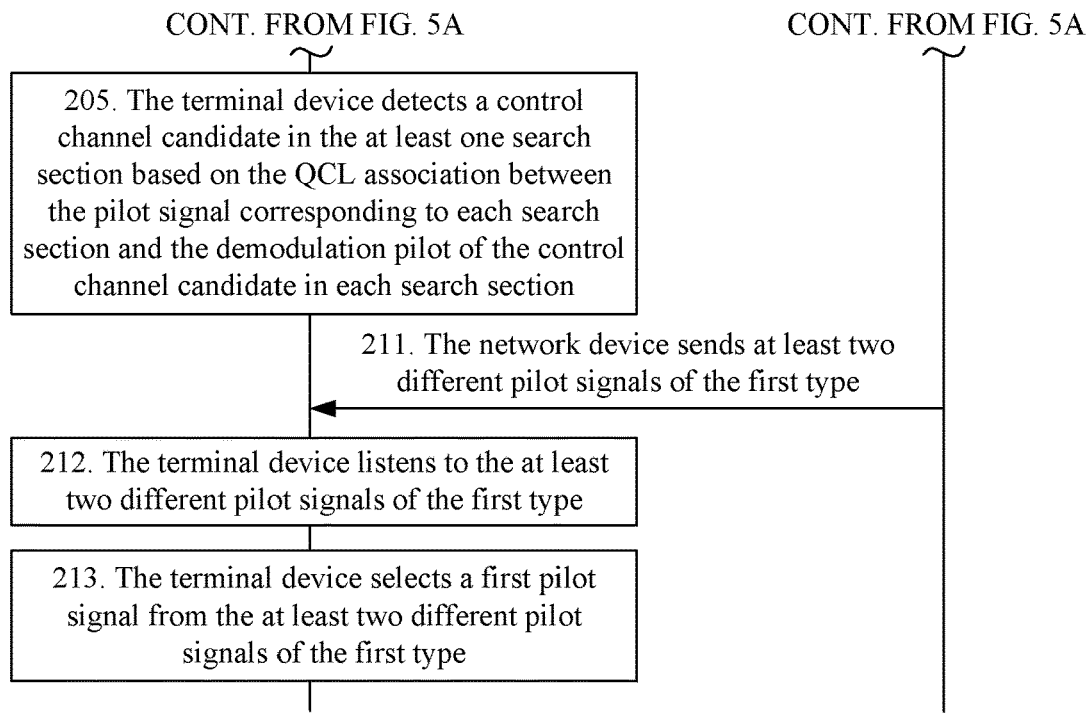

Optionally, in an embodiment, as shown in FIG. 5A and FIG. 5B, the method 200 may further include the following content.

211. The network device sends at least two different pilot signals of the first type.

Optionally, the first pilot signal is a pilot signal of the first type, and may be a downlink synchronization signal, or may be a demodulation pilot of a broadcast channel, or may be a beam measurement pilot.

Optionally, the at least two different pilot signals of the first type are sent by the network device on different transmit beams.

212. The terminal device listens to the at least two different pilot signals of the first type.

Optionally, the terminal device listens to the at least two different pilot signals of the first type on different receive beams.

213. The terminal device selects the first pilot signal from the at least two different pilot signals of the first type.

Optionally, the random access preamble sent by the terminal device carries an identifier of the first pilot signal.

Optionally, the terminal device determines, based on the identifier of the first pilot signal, a first pilot signal having the identifier as the pilot signal corresponding to the communal search section.

Optionally, the terminal device determines, based on the identifier of the first pilot signal, a pilot signal of the first type that is obtained through listening on a beam for sending the first pilot signal having the identifier, as the pilot signal corresponding to the communal search section.

Therefore, in this embodiment of this application, that a DMRS of a candidate in the communal search section of the control channel has a QCL association with the pilot signal of the first type (the synchronization signal, the demodulation pilot of the broadcast channel, and the beam measurement pilot) is defined, thereby resolving a channel estimation issue during blind detection on the candidate in the communal search section without a CRS.

Figure 6A:
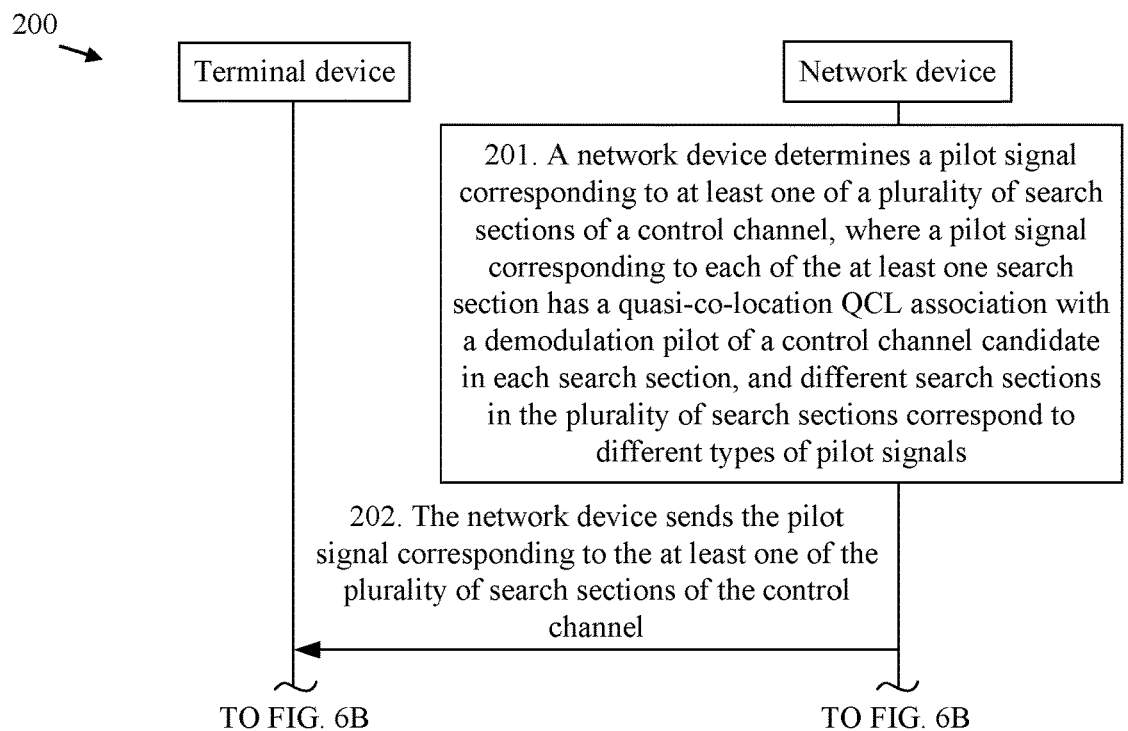
FIG. 6A and FIG. 6B are a schematic flowchart of a wireless communication method according to still another embodiment of this application.
Figure 6B:
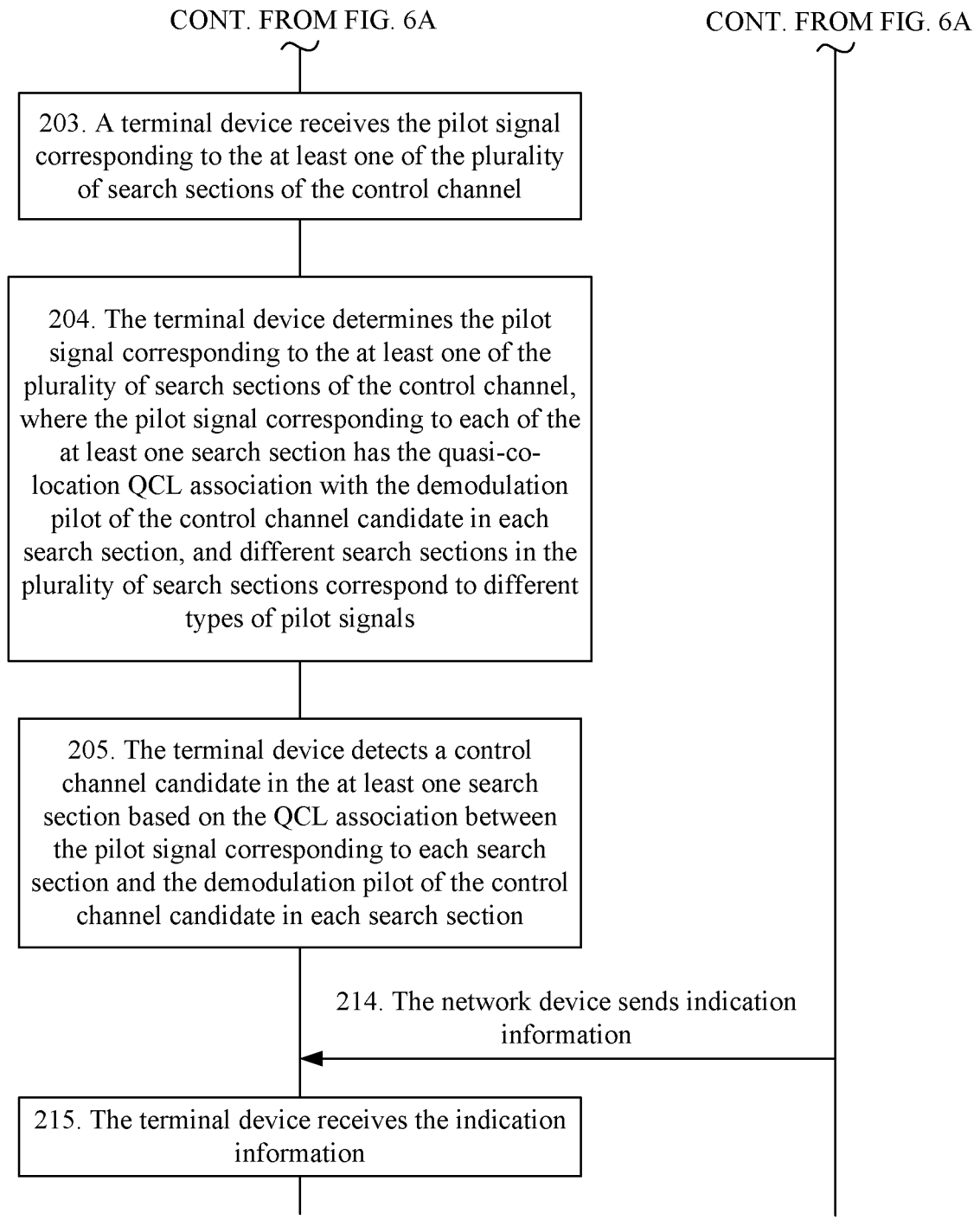

Optionally, in an embodiment, as shown in FIG. 6A and FIG. 6B, the method 200 may further include the following content.

214. The network device sends indication information by using higher layer signaling.

Optionally, the higher layer signaling may be radio resource control (RRC) signaling.

Optionally, the indication information is used to indicate at least one type of the following information: beam identifiers of the N transmit beams, beam identifiers of the N beam pairs, the second correspondence, and the fourth correspondence.

215. The terminal device receives the indication information.

Optionally, the terminal device receives the higher layer signaling.

Optionally, the terminal device may determine pilot signals corresponding to a plurality of user specific search sections based on the higher layer signaling.

Optionally, the determining, by the terminal device, the pilot signal corresponding to the user specific search section of the control channel includes:

determining, based on a first correspondence between a total of M control channel candidates of the user specific search section and N transmit beams and a second correspondence between the N transmit beams and N pilot signals of the second type, pilot signals of the second type that respectively have QCL associations with the M control channel candidates, where M and N are integers greater than or equal to 2, where the first correspondence is determining, based on a beam identifier n of N beams, a resource location $\{C_i^n\}$, $0<i\leq S^n$ of a control channel candidate set corresponding to the beam identifier n, $S^n$ is a quantity of control channel candidates corresponding to the beam identifier n, and $C_i^n$ is an identifier of an $i^{th}$ control channel candidate corresponding to the beam identifier n; and the second correspondence is sending the N pilot signals of the second type by using the N transmit beams, and pilot signals of the second type that are sent by using different transmit beams in the N transmit beams are different from each other.

Optionally, the determining, by the terminal device, the pilot signal corresponding to the user specific search section of the control channel includes:

determining, based on a third correspondence between a total of M control channel candidates of the user specific search section, N transmit beams, and an ID of the terminal device and a second correspondence between the N transmit beams and N pilot signals of the second type, pilot signals of the second type that respectively have QCL associations with the M control channel candidates, where M and N are integers greater than or equal to 2, where the second correspondence is sending the N pilot signals of the second type by using the N transmit beams, and pilot signals of the second type that are sent by using different transmit beams in the N transmit beams are different from each other; and the third correspondence is determining, jointly based on the beam identifier and ID information of the terminal device, a resource location $\{C_i^n\}$, $0<i\leq S^n$ of a control channel candidate set corresponding to each beam, where $S^n$ is a quantity of control channel candidates corresponding to the beam identifier n, and $C_i^n$ is an identifier of an $i^{th}$ control channel candidate corresponding to the beam identifier n.

Optionally, the determining, by the terminal device, the pilot signal corresponding to the at least one of the plurality of search sections of the control channel includes:

determining, based on a fourth correspondence between a total of M control channel candidates of the user specific search section and N pilot signals of the second type, pilot signals of the second type that respectively have QCL associations with the M control channel candidates, where M and N are integers greater than or equal to 2, where the fourth correspondence is determining, based on an identifier n of the N pilot signals of the second type, a resource location $\{C_i^n\}$, $0<i\leq S^n$ of a control channel candidate set corresponding to the identifier n, $S^n$ is a quantity of control channel candidates corresponding to the identifier n of the pilot signal of the second type, and $C_i^n$ is an identifier of an $i^{th}$ control channel candidate corresponding to the identifier n of the pilot signal of the second type.

Optionally, $S^n$ control channel candidates corresponding to a same beam in the N transmit beams have a QCL association with a same pilot signal of the second type.

Optionally, a demodulation pilot of the $S^n$ control channel candidates corresponding to the beam identifier n in the first correspondence has a QCL association with a pilot of the second type that is sent by using a beam corresponding to a beam n in the second correspondence.

Optionally, a demodulation pilot of the $S''$ control channel candidates corresponding to the beam identifier n and the ID information of the terminal device in the third correspondence has a QCL association with a pilot of the second type that is sent by using a beam corresponding to a beam n in the second correspondence.

Optionally, the determining, by the terminal device, the pilot signal corresponding to the user specific search section of the control channel includes:

determining, based on a first correspondence between a total of M control channel candidates of the user specific search section and N beam pairs and a second correspondence between the N beam pairs and N pilot signals of the second type, pilot signals of the second type that respectively have QCL associations with the M control channel candidates, where M and N are integers greater than or equal to 2, where each of the N beam pairs includes at least one pair of beams, the at least one pair of beams includes a transmit beam and a receive beam, the transmit beam is a transmit beam of the network device, and the receive beam is a receive beam of the terminal device; and the first correspondence is determining, based on a beam pair identifier n of the N beam pairs, a resource location $\{C_i^n\}$, $0<i\leq S''$ of a control channel candidate set corresponding to the beam pair identifier n, $S''$ is a quantity of control channel candidates corresponding to the beam pair identifier n, and $C_i^n$ is an identifier of an $i^{th}$ control channel candidate corresponding to the beam pair identifier n; and the second correspondence is sending, by the network device, the N pilot signals of the second type by using transmit beams in the N beam pairs, and receiving, by the terminal device, the N pilot signals of the second type by using receive beams in the N beam pairs, where pilot signals of the second type that are sent and received by using different beam pairs in the N beam pairs are different from each other, and a beam for sending each pilot signal of the second type and a beam for receiving the pilot signal of the second type are respectively a transmit beam and a receive beam in a same beam pair.

Optionally, the determining, by the terminal device, the pilot signal corresponding to the user specific search section of the control channel includes:

determining, based on a third correspondence between a total of M control channel candidates of the user specific search section, N beam pairs, and a user identity (Identity, ID) of the terminal device and a second correspondence between the N beam pairs and N pilot signals of the second type, pilot signals of the second type that respectively have QCL associations with the M control channel candidates, where M and N are integers greater than or equal to 2, where each of the N beam pairs includes a transmit beam and a receive beam, the transmit beam is a transmit beam of the network device, and the receive beam is a receive beam of the terminal device; and the second correspondence is sending, by the network device, the N pilot signals of the second type by using transmit beams in the N beam pairs, and receiving, by the terminal device, the N pilot signals of the second type by using receive beams in the N beam pairs, where pilot signals of the second type that are sent and received by using different beam pairs in the N beam pairs are different from each other, and a beam for sending each pilot signal of the second type and a beam for receiving the pilot signal of the second type are respectively a transmit beam and a receive beam in a same beam pair; and the third correspondence is determining, jointly based on the beam pair identifier and ID information of the terminal device, a resource location $\{C_i^n\}$, $0<i\leq S''$ of a control channel candidate set corresponding to each beam pair, where $S''$ is a quantity of control channel candidates corresponding to the beam pair identifier n, and $C_i^n$ is an identifier of an $i^{th}$ control channel candidate corresponding to the beam identifier n.

Optionally, $S''$ control channel candidates corresponding to a same beam pair in the N beam pairs have a QCL association with a same pilot signal of the second type.

Optionally, a demodulation pilot of the $S''$ control channel candidates corresponding to the beam pair identifier n in the first correspondence has a QCL association with a pilot, corresponding to a beam pair n in the second correspondence, of the second type.

Optionally, a demodulation pilot of the $S''$ control channel candidates corresponding to the beam pair identifier n and the ID information of the terminal device in the third correspondence has a QCL association with a pilot of the second type that is sent by using a beam corresponding to a beam pair n in the second correspondence.

Optionally, the first correspondence and the third correspondence may be preset, and the terminal device may directly obtain the preset correspondences.

Optionally, the foregoing solutions in this embodiment are specifically described by using the terminal device as an execution body, and also applicable to the network device.

Therefore, in this embodiment of this application, the network device enables, through configuration, different user specific search sections to correspond to different transmit beams, and DMRSs of candidates in the different user specific search sections to have QCL associations with different CSI-RSs, so that the terminal device can perform blind detection in the plurality of user specific search sections without a CRS, thereby resolving a channel estimation issue during blind detection for the control channel.

The wireless communication method 200 according to this embodiment of this application is described below by using Embodiment 1 and Embodiment 2 as examples.

Embodiment 1 of this Application

A network device sends different pilot signals of a first type. Optionally, the pilot signal of the first type is at least one of the following signals: a synchronization signal, a demodulation pilot of a broadcast channel, and a beam measurement pilot. For example, the pilot signal of the first type is the synchronization signal. There are a plurality of methods for the network device to send different synchronization signals. For example, the different synchronization signals are sent by using different beams, or the different synchronization signals are sent by using different time-frequency resources, or the different synchronization signals may have different synchronization signal sequences. Therefore, the different synchronization signals have different identifiers. The following provides a description by using an example in which the different synchronization signals are sent by using different transmit beams. The different beams have different identifiers.

The network device sends the different synchronization signals by using at least two beams. A terminal device listens to the synchronization signals sent on the at least two beams, and selects one of the beams. For example, the terminal device may select a beam having highest received power (RSRP), or select a beam having a highest received signal-to-noise ratio, or select a beam having highest received quality (RSRQ).

Optionally, the terminal device measures the synchronization signal on the selected beam, and the terminal device may estimate a delay spread, a Doppler spread, a Doppler frequency shift, and an average delay of an equivalent channel corresponding to the beam, angle information of the channel, and the like. The angle information of the channel includes an average angle of arrival (AOA), an angular spread of an angle of arrival, an average angle of departure (AOD), and an angular spread of an angle of departure, and the like.

Optionally, after selecting the synchronization signal and the transmit beam corresponding to the synchronization signal, the terminal device initiates a random access request, for example, sends a random access preamble, on an uplink random access channel. In this case, the terminal device sends a preamble associated with the beam.

Optionally, the association relationship may be: different preambles correspond to different synchronization signal sequences, or time-frequency resources of different preambles correspond to different synchronization signal sequences, or time-frequency resources of different preambles correspond to time-frequency resources of different synchronization signals, or different preambles correspond to time-frequency resources of different synchronization signals.

The network device may determine the transmit beam for the terminal device based on the preamble sent by the terminal device and the association relationship between a preamble and a synchronization signal.

After detecting the random access request of the terminal device and determining the transmit beam for the terminal device, the network device selects a candidate in a communal search section of a PDCCH, sends the PDCCH to the user equipment on the candidate, and schedules the response to the random access request of the terminal device by using DCI carried on the PDCCH. The network device sends the PDCCH to the terminal device by using the determined transmit beam.

When detecting the downlink control channel PDCCH, the terminal device needs to perform blind detection on at least one candidate in the communal search section. During blind detection on the candidate, a channel of the currently detected candidate needs to be estimated. During channel estimation, channel interpolation needs to be performed by using at least one parameter in the delay spread, the Doppler spread, the Doppler frequency shift, the average delay, an angle parameter of the channel, and the like that are estimated on the synchronization signal corresponding to the selected transmit beam. The angle parameter of the channel includes the average angle of arrival, the angular spread of the angle of arrival, the average angle of departure, and the angular spread of the angle of departure, and the like.

In Embodiment 1 of this application, the network device uses the same transmit beam to send the synchronization signal associated with the preamble of the terminal device and send each candidate in the communal search section. Therefore, the synchronization signal has a QCL association with a DMRS of each candidate in the communal search section. Therefore, channel interpolation estimation in the communal search section may be performed by using a parameter estimated by using the synchronization signal.

Therefore, in Embodiment 1 of this application, that a DMRS of a candidate in the communal search section of the control channel has a QCL association with the pilot signal of the first type (the synchronization signal, the demodulation pilot of the broadcast channel, and the beam measurement pilot) is defined, thereby resolving a channel estimation issue during blind detection by the terminal device on the candidate in the communal search section without a CRS.

After the terminal device successfully accesses a cell, the network device determines X transmit beams for the terminal device by performing a series of beam processing operations, for example, a beam management process, where X is an integer greater than or equal to 1. The network device indicates, based on identifiers of the X transmit beams for the terminal device, the identifiers of the X transmit beams by using higher layer signaling. The terminal device receives the higher layer signaling, and determines, based on the identifiers of the X transmit beams, a resource location $\{C_i^n\}$, $0 < i \leq S^n$ of a candidate in a user specific search section corresponding to each transmit beam, where $S^n$ is a quantity of control channel candidates corresponding to the beam identifier n, and $C_i^n$ is an identifier of an $i^{th}$ control channel candidate corresponding to the beam identifier n. All candidates in a same user specific search section are sent by a transmit beam corresponding to the search section. This is a first correspondence. In addition, the network device further configures, by using higher layer signaling, channel measurement pilots CSI-RSs corresponding to the X beams. Each CSI-RS is sent by the network device by using a corresponding beam. This is a second correspondence. Therefore, each CSI-RS may correspond to one user specific search section by using a transmit beam corresponding to the CSI-RS. A transmit beam for all candidates in the user specific search section is the same as the transmit beam of the CSI-RS. Therefore, DMRSs of all the candidates in the user specific search section have a QCL association with the CSI-RS. Optionally, the terminal device may calculate, according to a predefined or notified rule by using the identifiers of the two beams and an ID of the terminal device, resource locations of candidate sets in user specific search sections corresponding to the two beams. This is a third correspondence.

Figure 7:
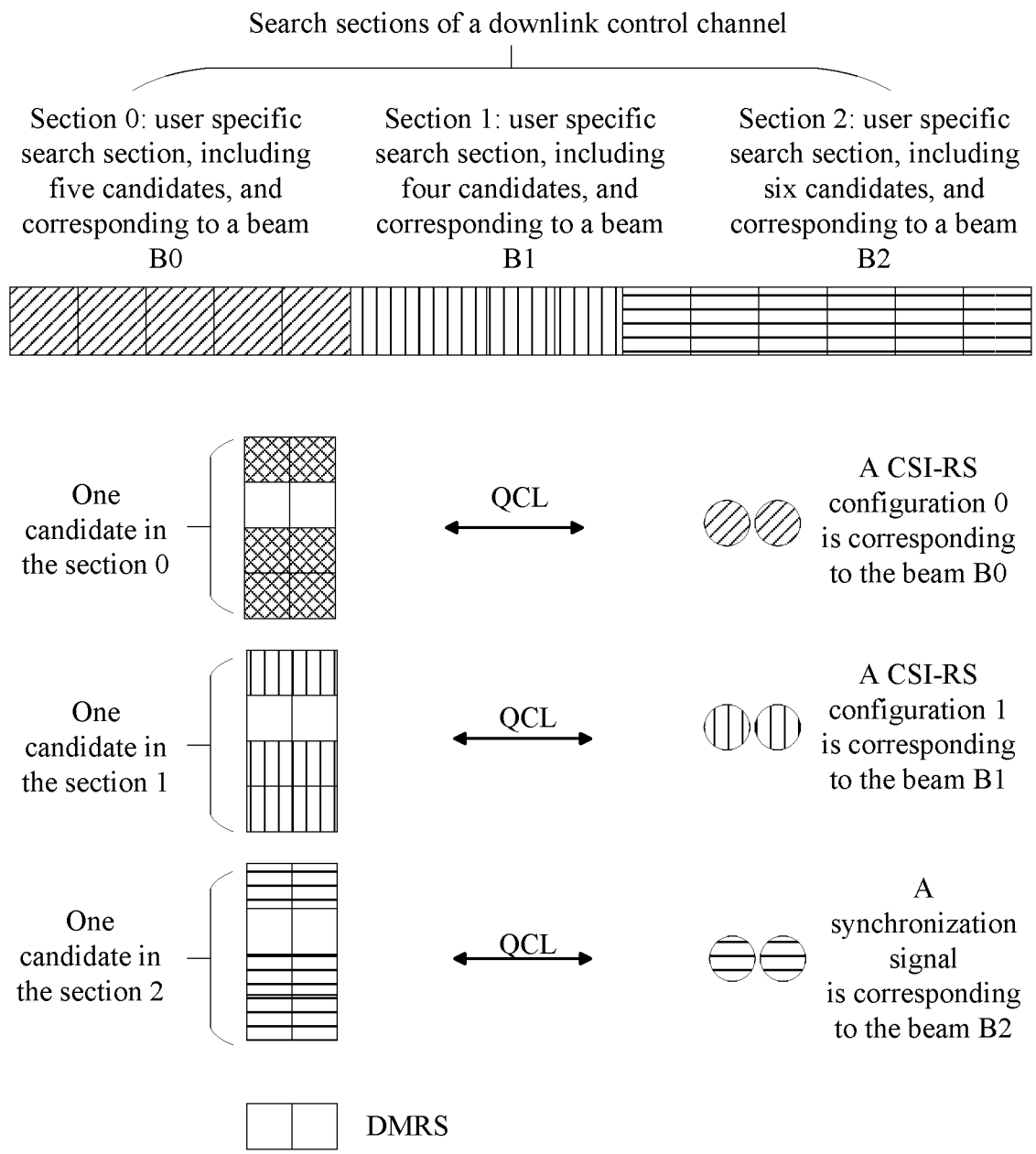
FIG. 7 is a schematic diagram of a type of wireless communication according to an embodiment of this application.

A description is provided by using FIG. 7 as an example. The network device determines two transmit beams for the terminal device. The two transmit beams are B0 and B1, and beam identifiers are 0 and 1 respectively. In other words, X=2. The network device indicates the identifiers of the two beams by using higher layer signaling. The terminal device may calculate, according to a predefined or notified rule, resource locations of candidate sets in two user specific search sections corresponding to the two beams. As shown in the figure, a user specific search section corresponding to B0 is a section 0, and a candidate set in the section 0 includes five elements $C_i^0$ (i=1, . . . , 5) in other words, $S^0$=5; a user specific search section corresponding to B1 is a section, and a candidate set in the section 1 includes four elements $C_i^1$ (i=1, . . . , 4) in other words, $S^1$=4. A section 2 is a communal search section, a candidate set in the section 2 includes six elements, and a corresponding beam is B2. B2 is determined by using the foregoing process for determining a first pilot signal (which is the synchronization signal in Embodiment 1 of this application). In addition, the network device further configures CSI-RSs corresponding to the beams B0 and B1 by using higher layer signaling. The CSI-RSs have a CSI-RS configuration 0 and a CSI-RS configuration 1. A CSI-RS having the CSI-RS configuration 0 is sent by the network device by using the beam B0, and a CSI-RS having the CSI-RS configuration 1 is sent by the network device by using the beam B1. Therefore, a demodulation pilot of the candidate set in the section 0 corresponding to B0 has a QCL association with the CSI-RS having the CSI-RS 1, and a DMRS of the candidate set in the section 1 corresponding to B1 has a QCL association with the CSI-RS having the CSI-RS 1.

Optionally, the network device may further directly configure, by using higher layer signaling, X CSI-RSs corresponding to X user specific search sections. This is a fourth correspondence. A DMRS of a candidate set in each user specific search section has a QCL association with a corresponding CSI-RS. For example, in FIG. 7, through direct configuration, the section 0 is enabled to correspond to the CSI-RS configuration 0, and the section 1 is enabled to correspond to the CSI-RS configuration 1. Therefore, the demodulation pilot of the candidate set in the section 0 has a QCL association with the CSI-RS having the CSI-RS 0, and the DMRS of the candidate set in the section 1 has a QCL association with the CSI-RS having the CSI-RS 0.

Optionally, aggregation level sets of candidates of search sections corresponding to the X transmit beams may be further explicitly configured in the higher layer signaling. Aggregation level sets of candidates of search sections corresponding to different transmit beams are separately configured, and each aggregation level set includes at least one aggregation level. For example, in FIG. 7, it is configured in the higher layer signaling that an aggregation level set of the candidate set in the section 0 corresponding to the beam B0 is {1, 2}, and an aggregation level set of the candidate set in the search section corresponding to the beam B1 is {4, 8}.

Optionally, an aggregation level set of candidates of a search section corresponding to each transmit beam may be implicitly indicated by the network device by indicating a sequence of beam identifiers in the higher layer signaling. For example, a transmit beam corresponding to a first indicated beam identifier in the higher layer signaling has relatively high received power, and an aggregation level set of a search section corresponding to the transmit beam may include a relatively low aggregation level; a transmit beam corresponding to a second indicated beam identifier in the higher layer signaling has relatively low received power, and an aggregation level of a search section corresponding to the transmit beam may include a relatively high aggregation level. Received power information of each transmit beam may be reported by the terminal device, or obtained by the base station through measurement. For example, in FIG. 7, the higher layer signaling indicates the beams B0 and B1, and received power of the transmit beam B0 is higher than received power of the transmit beam B1. According to a pre-defined criterion, the terminal device may determine that an aggregation level set of a control channel candidate set corresponding to the transmit beam B0 is {1, 2}, and an aggregation level set of a control channel candidate set corresponding to the transmit beam B1 is {2, 4}.

Optionally, an aggregation level set of a candidate set of a search section corresponding to each transmit beam may be implicitly indicated through comparison between received power of each transmit beam and a threshold. For example, if received power of a transmit beam corresponding to a transmit beam identifier n indicated in the higher layer signaling is greater than a first threshold, an aggregation level set of control channel candidates corresponding to the transmit beam includes a relatively low aggregation level, for example, {1, 2}. If received power of a transmit beam corresponding to a transmit beam identifier n indicated in the higher layer signaling is less than a first threshold, an aggregation level set of control channel candidates corresponding to the transmit beam includes a relatively high aggregation level, for example, {4, 8}. Received power information of each transmit beam may be reported by the terminal device, or obtained by the base station through measurement.

The network device sends the X CSI-RSs by using the X transmit beams. These CSI-RSs may be sent by the network device to the terminal device periodically, or sent to the terminal device aperiodically, or sent to the terminal device in a semi-persistent manner. The terminal device obtains parameters such as a delay spread, a Doppler spread, a Doppler frequency shift, an average delay, and angle information of a channel by measuring each CSI-RS. The angle information of the channel includes an average angle of arrival, an angular spread of an angle of arrival, an average angle of departure, and an angular spread of an angle of departure, and the like.

Optionally, in addition to the CSI-RS, a pilot signal having a QCL association with a DMRS of a user specific search section may be a pilot signal of another type.

The network device sends a downlink control channel PDCCH to the terminal device by using a candidate in a user specific search space. During blind detection for the PDCCH, the terminal device detects, based on a configuration of the network device, a candidate in a user specific search section corresponding to at least one of the beams. A channel estimation interpolation parameter used during detection of a candidate in a user specific search section corresponding to one of the beams is obtained based on measurement of a CSI-RS having a QCL association.

Optionally, in Embodiment 1 of this application, a receive beam of the terminal device may be an omnidirectional beam.

Therefore, in Embodiment 1 of this application, the network device enables, through configuration, DMRSs of candidates in different user specific search sections to have QCL associations with different CSI-RSs, thereby resolving a channel estimation issue during blind detection by the terminal device on a candidate in a user specific search section without a CRS.

Embodiment 2 of this Application

Optionally, in Embodiment 2 of this application, receive beams of a terminal device may be a plurality of non-omnidirectional beams, and different receive beams have different directions.

A network device sends different pilot signals of a first type. Optionally, the pilot signal of the first type is at least one of the following signals: a synchronization signal, a demodulation pilot of a broadcast channel, and a beam measurement pilot. For example, the pilot signal of the first type is the synchronization signal. There are a plurality of methods for the network device to send different synchronization signals. For example, the different synchronization signals are sent by using different beams, or the different synchronization signals are sent by using different time-frequency resources, or the different synchronization signals may have different synchronization signal sequences. Therefore, the different synchronization signals have different identifiers. The following provides a description by using an example in which the different synchronization signals are sent by using different transmit beams. In this case, the synchronization signals sent by using the different beams may have different synchronization signal sequences, or occupy different time-frequency resources. The different beams have different identifiers.

The network device sends the different synchronization signals by using at least two transmit beams. The terminal device listens to the synchronization signals sent on the at least two transmit beams. The terminal device selects one of the transmit beams, and determines a receive beam to be used for the transmit beam, so as to determine a beam pair. There may be a plurality of rules for the terminal device to determine the beam pair. For example, the terminal device may select a beam pair having highest received power (RSRP), or select a beam pair having a highest received signal-to-noise ratio, or select a beam pair having highest received quality (RSRQ).

Optionally, the terminal device measures the synchronization signal on the selected beam pair, and the terminal device may estimate a delay spread, a Doppler spread, a Doppler frequency shift, and an average delay of an equivalent channel corresponding to the beam pair, angle information of the channel, and the like. The angle information of the channel includes an average angle of arrival (AOA), an angular spread of an angle of arrival, an average angle of departure (AOD), and an angular spread of an angle of departure, and the like.

Optionally, after selecting the synchronization signal and the beam pair corresponding to the synchronization signal, the terminal device initiates a random access request, for example, sends a random access preamble, on an uplink random access channel. In this case, the terminal device sends a preamble associated with the beam pair.

Optionally, the association relationship may be: different preambles correspond to different synchronization signal sequences, or time-frequency resources of different preambles correspond to different synchronization signal sequences, or time-frequency resources of different preambles correspond to time-frequency resources of different synchronization signals, or different preambles correspond to time-frequency resources of different synchronization signals.

The network device may determine the transmit beam for the terminal device based on the preamble sent by the terminal device and the association relationship between a preamble and a synchronization signal, or may further determine the receive beam that is selected by the terminal for the transmit beam.

After detecting the random access request of the terminal device and determining the transmit beam for the terminal device, the network device selects a candidate in a communal search section of a PDCCH, sends the PDCCH to the user equipment on the candidate, and schedules the response to the random access request of the terminal device by using DCI carried on the PDCCH. The network device sends the PDCCH to the terminal device by using the determined transmit beam.

The terminal device receives the downlink control channel by using the receive beam in the selected beam pair, and determines, through blind detection on at least one candidate in the communal search section, the DCI sent by the network device to the terminal device. During blind detection on the candidate, a channel of the currently detected candidate needs to be estimated. During channel estimation, channel interpolation needs to be performed by using at least one parameter in the delay spread, the Doppler spread, the Doppler frequency shift, the average delay, an angle parameter of the channel, and the like that are estimated above on the synchronization signal corresponding to the selected beam pair. The angle parameter of the channel includes the average angle of arrival, the angular spread of the angle of arrival, the average angle of departure, and the angular spread of the angle of departure, and the like.

In Embodiment 2 of this application, the network device uses the same transmit beam to send the synchronization signal associated with the preamble of the terminal device and send each candidate in the communal search section, and the terminal device uses the same receive beam to receive the synchronization signal and each candidate in the communal search section. Therefore, the synchronization signal has a QCL association with a DMRS of each candidate in the communal search section. Therefore, channel interpolation estimation in the communal search section may be performed by using a parameter estimated by using the synchronization signal.

Therefore, in Embodiment 2 of this application, that a DMRS of a candidate in the communal search section of the control channel has a QCL association with the pilot signal of the first type (the synchronization signal, the demodulation pilot of the broadcast channel, and the beam measurement pilot) is defined, thereby resolving a channel estimation issue during blind detection by the terminal device on the candidate in the communal search section without a CRS.

Figure 8:
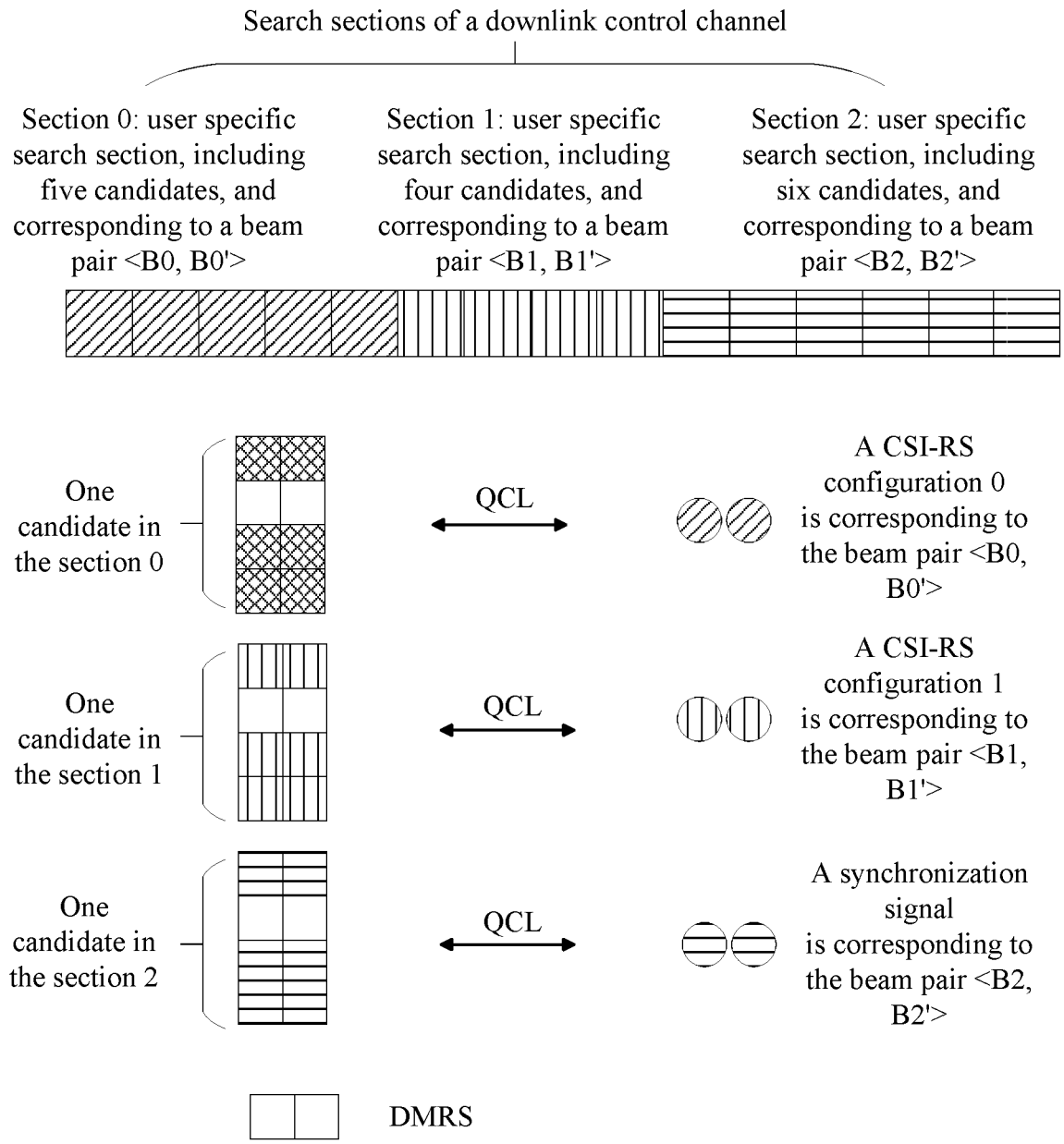
FIG. 8 is a schematic diagram of another type of wireless communication according to an embodiment of this application.

In Embodiment 2 of this application, after the terminal device successfully accesses a cell, the network device determines X beam pairs for the terminal device by performing, for example, a beam management process, where X is an integer greater than or equal to 1. Each beam pair includes a transmit beam of the network device and a receive beam of the terminal device. For example, in FIG. 8, the network device determines two beam pairs for the terminal device. The two beam pairs are <B0, B0'> and <B1, B1'>, and beam pair identifiers are 0 and 1, respectively. In other words, X=2. The network device indicates the identifiers of the two beam pairs by using higher layer signaling. The terminal device may calculate, according to a predefined or notified rule, resource locations of candidate sets in two user specific search sections corresponding to the two beam pairs. This is a first correspondence. As shown in FIG. 8, a user specific search section corresponding to <B0, B0'> is a section 0, and a candidate set in the section 0 includes five elements $C_i^0$ (i=1, . . . , 5) in other words, $S^0$=5; a user specific search section corresponding to <B1, B1'> is a section, and a candidate set in the section 1 includes four elements $C_i^1$ (i=1, . . . , 4), in other words, $S^1$=4. A section 2 is a communal search section, a candidate set in the section 2 includes six elements, and a corresponding beam pair is <B2, B2'>. <B2, B2'> is determined by using the foregoing process for determining a first pilot signal (which is the synchronization signal in Embodiment 2 of this application). In addition, the network device further configures CSI-RSs corresponding to the beams <B0, B0'> and <B1, B1'> by using higher layer signaling. The CSI-RSs have a CSI-RS configuration 0 and a CSI-RS configuration 1. A CSI-RS having the CSI-RS configuration 0 is sent by the network device by using the beam B0 and received by the terminal device by using the beam B0', and a CSI-RS having the CSI-RS configuration 1 is sent by the network device by using the beam B1 and received by the terminal device by using the beam B1'. This is a second correspondence. Therefore, a demodulation pilot of the candidate set in the section 0 corresponding to <B0, B0'> has a QCL association with the CSI-RS having the CSI-RS 0, and a DMRS of the candidate set in the section 1 corresponding to <B1, B1'> has a QCL association with the CSI-RS having the CSI-RS 0.

Optionally, the terminal device may calculate, according to a predefined or notified rule by using the identifiers of the two beam pairs and an ID of the terminal device, resource locations of candidate sets in user specific search sections corresponding to the two beams. This is a third correspondence.

Optionally, the network device may further directly configure, by using higher layer signaling, X=2 CSI-RSs corresponding to X=2 user specific search sections. This is a fourth correspondence. A DMRS of a candidate set in each user specific search section has a QCL association with a corresponding CSI-RS. For example, in FIG. 8, through direct configuration, the section 0 is enabled to correspond to the CSI-RS configuration 0, and the section 1 is enabled to correspond to the CSI-RS configuration 1. Therefore, the demodulation pilot of the candidate set in the section 0 has a QCL association with the CSI-RS having the CSI-RS 0, and the DMRS of the candidate set in the section 1 has a QCL association with the CSI-RS having the CSI-RS 0.

Optionally, aggregation level sets of candidates of search sections corresponding to the X beam pairs may be further explicitly configured in the higher layer signaling. Alternatively, aggregation level sets of search sections corresponding to the X beam pairs may be implicitly configured in the higher layer signaling. Optionally, a specific configuration manner is similar to that in Embodiment 1 of this application. Details are not described again.

The network device sends the X CSI-RSs by using transmit beams in the X beam pairs. These CSI-RSs may be sent by the network device to the terminal device periodically, or sent to the terminal device aperiodically, or sent to the terminal device in a semi-persistent manner. The terminal device receives, based on the X configured beam pairs by using a receive beam of each beam pair, the CSI-RS sent by a transmit beam of the beam pair, and obtains parameters such as a delay spread, a Doppler spread, a Doppler frequency shift, and an average delay of an equivalent channel corresponding to the beam pair and angle information of the channel by measuring the CSI-RS. The angle information of the channel includes an average angle of arrival, an angular spread of an angle of arrival, an average angle of departure, and an angular spread of an angle of departure, and the like.

Optionally, in addition to the CSI-RS, a pilot signal having a QCL association with a DMRS of a user specific search section may be a pilot signal of another type.

The network device selects a candidate in a user specific search section, and sends a downlink control channel PDCCH to the terminal device on the candidate. The terminal device detects, based on a configuration of the network device, at least one candidate in a user specific search section corresponding to at least one beam pair. A channel estimation interpolation parameter used during blind detection on a candidate in a user specific search section is obtained based on measurement of a CSI-RS having a QCL association.

Therefore, in Embodiment 2 of this application, the network device enables, through configuration, DMRSs of candidates in different user specific search sections to have QCL associations with different CSI-RSs, thereby resolving a channel estimation issue during blind detection by the terminal device on a candidate in a user specific search section without a CRS.

Figure 9:
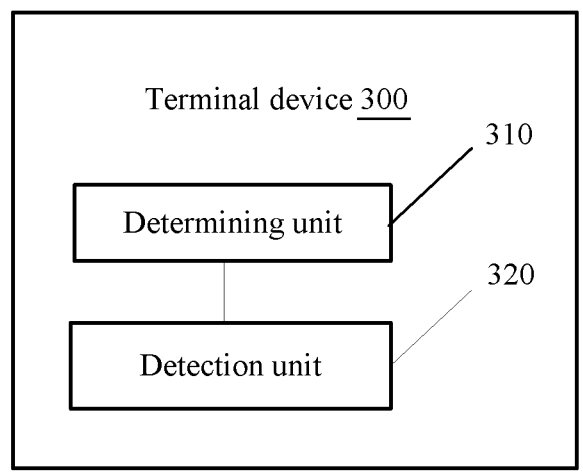
FIG. 9 is a schematic block diagram of a terminal device according to an embodiment of this application.

FIG. 9 is a schematic block diagram of a terminal device 300 according to an embodiment of this application. As shown in FIG. 9, the device 300 includes:

a determining unit 310, configured to determine a pilot signal corresponding to at least one of a plurality of search sections of a control channel, where a pilot signal corresponding to each of the at least one search section has a quasi-co-location QCL association with a demodulation pilot of a control channel candidate in each search section, and different search sections in the plurality of search sections correspond to different types of pilot signals; and a detection unit 320, configured to detect a control channel candidate in the at least one search section based on the QCL association between the pilot signal corresponding to each search section and the demodulation pilot of the control channel candidate in each search section.

Optionally, the plurality of search sections include a communal search section, and a pilot signal corresponding to the communal search section is a pilot signal of a first type; and the pilot signal of the first type is at least one of the following signals: a synchronization signal, a demodulation pilot of a broadcast channel, and a beam measurement pilot.

Optionally, the device further includes:

a sending unit, configured to send a random access preamble to a network device; and a receiving unit, configured to receive a random access response that is sent by the network device and that corresponds to the random access preamble, where the determining unit is further configured to:

determine, as the pilot signal corresponding to the communal search section, a first pilot signal associated with the random access preamble sent by the sending unit, where the first pilot signal is a pilot signal of the first type.

Optionally, before the determining unit determines, as the pilot signal corresponding to the communal search section, the first pilot signal associated with the random access preamble sent by the terminal device, the determining unit is further configured to:

determine, by the terminal device, the first pilot signal based on the random access preamble sent by the sending unit and a correspondence between a random access preamble and a pilot signal of the first type, where different random access preambles correspond to different sequences of pilot signals of the first type; or determine, by the terminal device, the first pilot signal based on the random access preamble sent by the sending unit and a correspondence between a random access preamble and a time-frequency resource of a pilot signal of the first type, where different random access preambles correspond to different time-frequency resources of pilot signals of the first type; or determine, by the terminal device, the first pilot signal based on a time-frequency resource of the random access preamble sent by the sending unit and a correspondence between a time-frequency resource of a random access preamble and a pilot signal of the first type, where the correspondence between a time-frequency resource of a random access preamble and a pilot signal of the first type is that different time-frequency resources of the random access preamble correspond to different sequences of pilot signals of the first type; or determine, by the terminal device, the first pilot signal based on a time-frequency resource of the random access preamble sent by the sending unit and a correspondence between a time-frequency resource of a random access preamble and a time-frequency resource of a pilot signal of the first type, where different time-frequency resources of the random access preamble correspond to different time-frequency resources of the first pilot signal.

Optionally, the device further includes:

a listening unit, configured to listen to at least two different pilot signals of the first type; and a selection unit, configured to select the first pilot signal from the at least two different pilot signals of the first type, where the random access preamble sent by the sending unit carries an identifier of the first pilot signal; and the determining unit is further configured to:

determine, based on the identifier of the first pilot signal, a pilot signal of the first type that has the identifier as the pilot signal corresponding to the communal search section.

Optionally, the at least two different pilot signals of the first type are sent by different transmit beams; and the determining unit is further configured to:

determine, based on the identifier of the first pilot signal, a pilot signal of the first type that is obtained through listening on a beam for sending the first pilot signal having the identifier, as the pilot signal corresponding to the communal search section.

Optionally, the determining unit is further configured to:

determine that a beam for sending a first signal and a beam for sending a control channel candidate corresponding to the first signal are a same beam, where the first signal is a pilot signal of the first type; and determine, as the pilot signal corresponding to the communal search section, the first signal that has a same transmit beam as the control channel candidate.

Optionally, the communal search section includes a control channel candidate for scheduling the random access response.

Optionally, the plurality of search sections include a user specific search section; and a pilot signal corresponding to the user specific search section is a pilot signal of a second type, and the pilot signal of the second type is a CSI-RS.

Optionally, the determining unit is further configured to:

determine, based on a first correspondence between a total of M control channel candidates of the user specific search section and N transmit beams and a second correspondence between the N transmit beams and N pilot signals of the second type, pilot signals of the second type that respectively have QCL associations with the M control channel candidates, where M and N are integers greater than or equal to 2, where the first correspondence is determining, based on a beam identifier n of N beams, a resource location $\{C_i^n\}$, $0 < i \leq S^n$ of a control channel candidate set corresponding to the beam identifier n, $S^n$ is a quantity of control channel candidates corresponding to the beam identifier n, and $C_i^n$ is an identifier of an $i^{th}$ control channel candidate corresponding to the beam identifier n; and the second correspondence is sending the N pilot signals of the second type by using the N transmit beams, and pilot signals of the second type that are sent by using different transmit beams in the N transmit beams are different from each other.

Optionally, the determining unit is further configured to:

determine, based on a third correspondence between a total of M control channel candidates of the user specific search section, N transmit beams, and an ID of the terminal device and a second correspondence between the N transmit beams and N pilot signals of the second type, pilot signals of the second type that respectively have QCL associations with the M control channel candidates, where M and N are integers greater than or equal to 2, where the second correspondence is sending the N pilot signals of the second type by using the N transmit beams, and pilot signals of the second type that are sent by using different transmit beams in the N transmit beams are different from each other; and the third correspondence is determining, jointly based on the beam identifier and ID information of the terminal device, a resource location $\{C_i^n\}$, $0 < i \leq S^n$ of a control channel candidate set corresponding to each beam, where $S^n$ is a quantity of control channel candidates corresponding to the beam identifier n, and $C_i^n$ is an identifier of an $i^{th}$ control channel candidate corresponding to the beam identifier n.

Optionally, the determining unit is further configured to:

determine, based on a fourth correspondence between a total of M control channel candidates of the user specific search section and N pilot signals of the second type, pilot signals of the second type that respectively have QCL associations with the M control channel candidates, where M and N are integers greater than or equal to 2, where the fourth correspondence is determining, based on an identifier n of the N pilot signals of the second type, a resource location $\{C_i^n\}$, $0 < i \leq S^n$ of a control channel candidate set corresponding to the identifier n, $S^n$ is a quantity of control channel candidates corresponding to the identifier n of the pilot signal of the second type, and $C_i^n$ is an identifier of an $i^{th}$ control channel candidate corresponding to the identifier n of the pilot signal of the second type.

Optionally, $S^n$ control channel candidates corresponding to a same beam in the N transmit beams have a QCL association with a same pilot signal of the second type, where a demodulation pilot of the $S^n$ control channel candidates corresponding to the beam identifier n in the first correspondence has a QCL association with a pilot of the second type that is sent by using a beam corresponding to a beam n in the second correspondence; or a demodulation pilot of the $S^n$ control channel candidates corresponding to the beam identifier n and the ID information of the terminal device in the third correspondence has a QCL association with a pilot of the second type that is sent by using a beam corresponding to a beam n in the second correspondence.

Optionally, the determining unit is further configured to:

determine, based on a first correspondence between a total of M control channel candidates of the user specific search section and N beam pairs and a second correspondence between the N beam pairs and N pilot signals of the second type, pilot signals of the second type that respectively have QCL associations with the M control channel candidates, where M and N are integers greater than or equal to 2, where each of the N beam pairs includes a transmit beam and a receive beam, the transmit beam is a transmit beam of a network device, and the receive beam is a receive beam of the terminal device; and the first correspondence is determining, based on a beam pair identifier n of the N beam pairs, a resource location $\{C_i^n\}$, $0 < i \leq S^n$ of a control channel candidate set corresponding to the beam pair identifier n, $S^n$ is a quantity of control channel candidates corresponding to the beam pair identifier n, and $C_i^n$ is an identifier of an $i^{th}$ control channel candidate corresponding to the beam pair identifier n; and the second correspondence is sending, by the network device, the N pilot signals of the second type by using transmit beams in the N beam pairs, and receiving, by the terminal device, the N pilot signals of the second type by using receive beams in the N beam pairs, where pilot signals of the second type that are sent and received by using different beam pairs in the N beam pairs are different from each other, and a beam for sending each pilot signal of the second type and a beam for receiving the pilot signal of the second type are respectively a transmit beam and a receive beam in a same beam pair.

Optionally, the determining unit is further configured to:

determine, based on a third correspondence between a total of M control channel candidates of the user specific search section, N beam pairs, and an ID of the terminal device and a second correspondence between the N beam pairs and N pilot signals of the second type, pilot signals of the second type that respectively have QCL associations with the M control channel candidates, where M and N are integers greater than or equal to 2, where each of the N beam pairs includes a transmit beam and a receive beam, the transmit beam is a transmit beam of a network device, and the receive beam is a receive beam of the terminal device; and the second correspondence is sending, by the network device, the N pilot signals of the second type by using transmit beams in the N beam pairs, and receiving, by the terminal device, the N pilot signals of the second type by using receive beams in the N beam pairs, where pilot signals of the second type that are sent and received by using different beam pairs in the N beam pairs are different from each other, and a beam for sending each pilot signal of the second type and a beam for receiving the pilot signal of the second type are respectively a transmit beam and a receive beam in a same beam pair; and the third correspondence is determining, jointly based on the beam pair identifier and ID information of the terminal device, a resource location $\{C_i^n\}$, $0 \leq i \leq S^n$ of a control channel candidate set corresponding to each beam pair, where $S^n$ is a quantity of control channel candidates corresponding to the beam pair identifier n, and $C_i^n$ is an identifier of an $i^{th}$ control channel candidate corresponding to the beam identifier n.

Optionally, $S^n$ control channel candidates corresponding to a same beam pair in the N beam pairs have a QCL association with a same pilot signal of the second type, where a demodulation pilot of the $S^n$ control channel candidates corresponding to the beam pair identifier n in the first correspondence has a QCL association with a pilot, corresponding to a beam pair n in the second correspondence, of the second type; or a demodulation pilot of the $S^n$ control channel candidates corresponding to the beam pair identifier n and the ID information of the terminal device in the third correspondence has a QCL association with a pilot of the second type that is sent by using a beam corresponding to a beam pair n in the second correspondence.

Optionally, the receiving unit is further configured to:

receive indication information that is sent by the network device by using higher layer signaling, where the indication information is used to indicate at least one type of the following information: beam identifiers of the N transmit beams, beam identifiers of the N beam pairs, the second correspondence, and the fourth correspondence.

It should be understood that, the foregoing and other operations and/or functions of the units in the terminal device 300 according to this embodiment of this application are respectively used to implement corresponding procedures of the terminal device in the method 200 in FIG. 2. For brevity, details are not described herein again.

Figure 10:
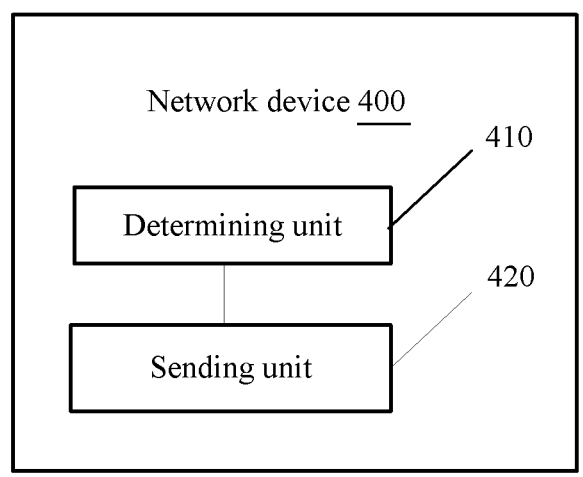
FIG. 10 is a schematic block diagram of a network device according to an embodiment of this application.

FIG. 10 is a schematic block diagram of a network device 400 according to an embodiment of this application. As shown in FIG. 10, the device 400 includes:

a determining unit 410, configured to determine a pilot signal corresponding to at least one of a plurality of search sections of a control channel, where a pilot signal corresponding to each of the at least one search section has a quasi-co-location QCL association with a demodulation pilot of a control channel candidate in each search section, and different search sections in the plurality of search sections correspond to different types of pilot signals; and a sending unit 420, configured to send the pilot signal corresponding to the at least one of the plurality of search sections of the control channel.

Optionally, the plurality of search sections include a communal search section, and a pilot signal corresponding to the communal search section is a pilot signal of a first type; and the pilot signal of the first type is at least one of the following signals: a synchronization signal, a demodulation pilot of a broadcast channel, and a beam measurement pilot.

Optionally, the device further includes:

a receiving unit, configured to receive a random access preamble sent by a terminal device, where the sending unit is further configured to send a random access response corresponding to the random access preamble to the terminal device; and the determining unit is further configured to:

determine, as the pilot signal corresponding to the communal search section, a first pilot signal associated with the random access preamble received by the network device, where the first pilot signal is a pilot signal of the first type.

Optionally, before the determining unit determines, as the pilot signal corresponding to the communal search section, the first pilot signal associated with the random access preamble received by the receiving unit, the determining unit is further configured to:

determine, by the terminal device, the first pilot signal based on the random access preamble received by the receiving unit and a correspondence between a random access preamble and a pilot signal of the first type, where different random access preambles correspond to different sequences of pilot signals of the first type; or determine, by the terminal device, the first pilot signal based on the random access preamble sent by the terminal device and a correspondence between a random access preamble and a time-frequency resource of a pilot signal of the first type, where different random access preambles correspond to different time-frequency resources of pilot signals of the first type; or determine, by the terminal device, the first pilot signal based on a time-frequency resource of the random access preamble received by the receiving unit and a correspondence between a time-frequency resource of a random access preamble and a pilot signal of the first type, where the correspondence between a time-frequency resource of a random access preamble and a pilot signal of the first type is that different time-frequency resources of the random access preamble correspond to different sequences of pilot signals of the first type; or determine, by the terminal device, the first pilot signal based on a time-frequency resource of the random access preamble received by the receiving unit and a correspondence between a time-frequency resource of a random access preamble and a time-frequency resource of a pilot signal of the first type, where different time-frequency resources of the random access preamble correspond to different time-frequency resources of the first pilot signal.

Optionally, the device further includes:

the sending unit is further configured to send at least two different pilot signals of the first type; and a selection unit, configured to select the first pilot signal from the at least two different pilot signals of the first type, where the random access preamble received by the receiving unit carries an identifier of the first pilot signal; and the determining unit is further configured to:

determine, based on the identifier of the first pilot signal, a pilot signal of the first type that has the identifier as the pilot signal corresponding to the communal search section.

Optionally, the at least two different pilot signals of the first type are sent by different transmit beams; and the determining unit is further configured to:

determine, based on the identifier of the first pilot signal, a pilot signal of the first type that is obtained through listening on a beam for sending the first pilot signal having the identifier, as the pilot signal corresponding to the communal search section.

Optionally, the determining unit is further configured to:

determine that a beam for sending a first signal and a beam for sending a control channel candidate corresponding to the first signal are a same beam, where the first signal is a pilot signal of the first type; and determine, as the pilot signal corresponding to the communal search section, the first signal that has a same transmit beam as the control channel candidate.

Optionally, the communal search section includes a control channel candidate for scheduling the random access response.

Optionally, the plurality of search sections include a user specific search section; and a pilot signal corresponding to the user specific search section is a pilot signal of a second type, and the pilot signal of the second type is a CSI-RS.

Optionally, the determining unit is further configured to:

determine, based on a first correspondence between a total of M control channel candidates of the user specific search section and N transmit beams and a second correspondence between the N transmit beams and N pilot signals of the second type, pilot signals of the second type that respectively have QCL associations with the M control channel candidates, where M and N are integers greater than or equal to 2, where the first correspondence is determining, based on a beam identifier n of N beams, a resource location $\{C_i^n\}$, $0 < i \leq S^n$ of a control channel candidate set corresponding to the beam identifier n, $S^n$ is a quantity of control channel candidates corresponding to the beam identifier n, and $C_i^n$ is an identifier of an $i^{th}$ control channel candidate corresponding to the beam identifier n; and the second correspondence is sending the N pilot signals of the second type by using the N transmit beams, and pilot signals of the second type that are sent by using different transmit beams in the N transmit beams are different from each other.

Optionally, the determining unit is further configured to:

determine, based on a third correspondence between a total of M control channel candidates of the user specific search section, N transmit beams, and an ID of the terminal device and a second correspondence between the N transmit beams and N pilot signals of the second type, pilot signals of the second type that respectively have QCL associations with the M control channel candidates, where M and N are integers greater than or equal to 2, where the second correspondence is sending the N pilot signals of the second type by using the N transmit beams, and pilot signals of the second type that are sent by using different transmit beams in the N transmit beams are different from each other; and the third correspondence is determining, jointly based on the beam identifier and ID information of the terminal device, a resource location $\{C_i^n\}$, $0 < i \leq S^n$ of a control channel candidate set corresponding to each beam, where $S^n$ is a quantity of control channel candidates corresponding to the beam identifier n, and $C_i^n$ is an identifier of an $i^{th}$ control channel candidate corresponding to the beam identifier n.

Optionally, based on a fourth correspondence between a total of M control channel candidates of the user specific search section and N pilot signals of the second type, pilot signals of the second type that respectively have QCL associations with the M control channel candidates are determined, where M and N are integers greater than or equal to 2, where the fourth correspondence is determining, based on an identifier n of the N pilot signals of the second type, a resource location $\{C_i^n\}$, $0 < i \leq S^n$ of a control channel candidate set corresponding to the identifier n, $S^n$ is a quantity of control channel candidates corresponding to the identifier n of the pilot signal of the second type, and $C_i^n$ is an identifier of an $i^{th}$ control channel candidate corresponding to the identifier n of the pilot signal of the second type.

Optionally, $S^n$ control channel candidates corresponding to a same beam in the N transmit beams have a QCL association with a same pilot signal of the second type, where a demodulation pilot of the $S^n$ control channel candidates corresponding to the beam identifier n in the first correspondence has a QCL association with a pilot of the second type that is sent by using a beam corresponding to a beam n in the second correspondence; or a demodulation pilot of the $S^n$ control channel candidates corresponding to the beam identifier n and the ID information of the terminal device in the third correspondence has a QCL association with a pilot of the second type that is sent by using a beam corresponding to a beam n in the second correspondence.

Optionally, the determining unit is further configured to:

determine, based on a first correspondence between a total of M control channel candidates of the user specific search section and N beam pairs and a second correspondence between the N beam pairs and N pilot signals of the second type, pilot signals of the second type that respectively have QCL associations with the M control channel candidates, where M and N are integers greater than or equal to 2, where each of the N beam pairs includes a transmit beam and a receive beam, the transmit beam is a transmit beam of the network device, and the receive beam is a receive beam of a terminal device; and the first correspondence is determining, based on a beam pair identifier n of the N beam pairs, a resource location $\{C_i^n\}$, $0 < i \leq S^n$ of a control channel candidate set corresponding to the beam pair identifier n, $S^n$ is a quantity of control channel candidates corresponding to the beam pair identifier n, and $C_i^n$ is an identifier of an $i^{th}$ control channel candidate corresponding to the beam pair identifier n; and the second correspondence is sending, by the network device, the N pilot signals of the second type by using transmit beams in the N beam pairs, and receiving, by the terminal device, the N pilot signals of the second type by using receive beams in the N beam pairs, where pilot signals of the second type that are sent and received by using different beam pairs in the N beam pairs are different from each other, and a beam for sending each pilot signal of the second type and a beam for receiving the pilot signal of the second type are respectively a transmit beam and a receive beam in a same beam pair.

Optionally, the determining unit is further configured to:

determine, based on a third correspondence between a total of M control channel candidates of the user specific search section, N beam pairs, and an ID of the terminal device and a second correspondence between the N beam pairs and N pilot signals of the second type, pilot signals of the second type that respectively have QCL associations with the M control channel candidates, where M and N are integers greater than or equal to 2, where each of the N beam pairs includes a transmit beam and a receive beam, the transmit beam is a transmit beam of the network device, and the receive beam is a receive beam of the terminal device; and the second correspondence is sending, by the network device, the N pilot signals of the second type by using transmit beams in the N beam pairs, and receiving, by the terminal device, the N pilot signals of the second type by using receive beams in the N beam pairs, where pilot signals of the second type that are sent and received by using different beam pairs in the N beam pairs are different from each other, and a beam for sending each pilot signal of the second type and a beam for receiving the pilot signal of the second type are respectively a transmit beam and a receive beam in a same beam pair; and the third correspondence is determining, jointly based on the beam pair identifier and ID information of the terminal device, a resource location $\{C_i^n\}$, $0 < i \leq S^n$ of a control channel candidate set corresponding to each beam pair, where $S^n$ is a quantity of control channel candidates corresponding to the beam pair identifier n, and $C_i^n$ is an identifier of an $i^{th}$ control channel candidate corresponding to the beam identifier n.

Optionally, $S^n$ control channel candidates corresponding to a same beam pair in the N beam pairs have a QCL association with a same pilot signal of the second type, where a demodulation pilot of the $S^n$ control channel candidates corresponding to the beam pair identifier n in the first correspondence has a QCL association with a pilot, corresponding to a beam pair n in the second correspondence, of the second type; or a demodulation pilot of the $S^n$ control channel candidates corresponding to the beam pair identifier n and the ID information of the terminal device in the third correspondence has a QCL association with a pilot of the second type that is sent by using a beam corresponding to a beam pair n in the second correspondence.

Optionally, the sending unit is further configured to:

send indication information, where the indication information is used to indicate at least one type of the following information: beam identifiers of the N transmit beams, beam identifiers of the N beam pairs, the second correspondence, and the fourth correspondence.

It should be understood that, the foregoing and other operations and/or functions of the units in the network device 400 according to this embodiment of this application are respectively used to implement corresponding procedures of the network device in the method 200 in FIG. 2. For brevity, details are not described herein again.

Figure 11:
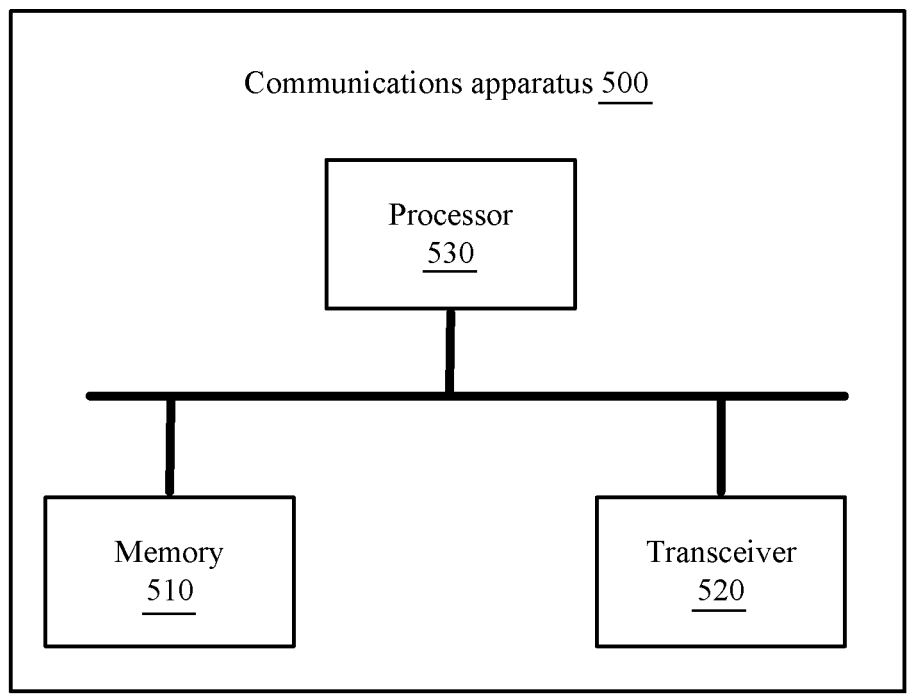
FIG. 11 is a schematic block diagram of a wireless communications device according to an embodiment of this application.

FIG. 11 is a schematic block diagram of a communications apparatus 500 according to an embodiment of this application. The communications apparatus 500 includes:

a memory 510, configured to store program code;

a transceiver 520, configured to communicate with another device; and a processor 530, configured to execute the program code in the memory 510.

Optionally, when the code is executed, the processor 530 can implement operations performed by the terminal device in the method 200. For brevity, details are not described herein again. In this case, the communications apparatus 500 may be a terminal device. The transceiver 520 is configured to receive and send specific signals when driven by the processor 530.

Optionally, when the code is executed, the processor 530 can implement operations performed by the network device in the method 200. For brevity, details are not described herein again. In this case, the communications apparatus 500 may be a network device. The transceiver 520 is configured to receive and send specific signals when driven by the processor 530.

It should be understood that in this embodiment of this application, the processor 530 may be a central processing unit (CPU), or the processor 530 may be another general-purpose processor, a digital signal processor, an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 510 may include a read-only memory and a random access memory, and provide an instruction and data to the processor 530. A part of the memory 510 may further include a non-volatile random access memory. For example, the memory 510 may further store device type information.

The transceiver 520 may be configured to implement signal sending and receiving functions, for example, frequency modulation and demodulation functions, also referred to as up-conversion and down-conversion functions.

In an implementation process, at least one step of the foregoing method may be completed by using an integrated logic circuit of hardware in the processor 530, or the integrated logic circuit may complete the at least one step when driven by an instruction in a software form. Therefore, the communications apparatus 500 may be a chip or a chip set. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor 530 reads information in the memory and completes the steps in the method in combination with hardware of the processor. To avoid repetition, details are not described herein again.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one place, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes instructions for instructing a computer device (which may be a personal computer, a server, a network device, or the like) to perform all or some of the steps of the method described in the embodiments of this application. The foregoing storage medium includes various media that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claim.

What is claimed is:

1. A wireless communication method, comprising:
    determining, by a terminal device, a pilot signal corresponding to a first search section of a plurality of search sections of a control channel, wherein the pilot signal has a quasi-co-location (QCL) association with a demodulation pilot of a control channel candidate in the first search section, wherein the demodulation pilot of the control channel candidate corresponds to a beam identifier, wherein different search sections in the plurality of search sections correspond to different types of pilot signals;
    detecting, by the terminal device, the control channel candidate in the first search section based on the QCL association between the pilot signal and the demodulation pilot of the control channel candidate in the first search section, wherein a resource location of the control channel candidate is based on the beam identifier;
    sending, by the terminal device, a random access preamble to a network device; and
    receiving a random access response from the network device that corresponds to the random access preamble, wherein the plurality of search sections comprises a communal search section associated with the random access preamble,
    wherein the determining, by the terminal device, the pilot signal corresponding to the first search section comprises:
        determining, as the pilot signal corresponding to the first search section, a first pilot signal corresponding to the communal search section, wherein the first pilot signal is a signal of a first type;
    wherein the first pilot signal being a signal of the first type comprises the first pilot signal being at least one of a synchronization signal, a demodulation pilot of a broadcast channel, or a beam measurement pilot; and
    wherein before the determining, as the pilot signal corresponding to the first search section, the first pilot signal corresponding to the communal search section, the method further comprises:
        determining, by the terminal device, the first pilot signal based on the random access preamble sent by the terminal device and a correspondence between the random access preamble and a sequence of signals of the first type, wherein different random access preambles correspond to different sequences of signals of the first type; or
        determining, by the terminal device, the first pilot signal based on a time-frequency resource of the random access preamble sent by the terminal device and a correspondence between the time-frequency resource of the random access preamble and a sequence of signals of the first type, wherein different time-frequency resources of different random access preambles correspond to different sequences of signals of the first type.

2. The method according to claim 1, wherein:
the plurality of search sections comprises a user specific search section; and
pilot signals corresponding to the user specific search section are signals of the second type.

3. A wireless communication method, comprising:
    determining, by a network device, a pilot signal corresponding to a first search section of a plurality of search sections of a control channel, wherein the pilot signal has a quasi-co-location (QCL) association with a demodulation pilot of a control channel candidate in the first search section, wherein the demodulation pilot of the control channel candidate corresponds to a beam identifier, and a resource location of the control channel candidate is based on the beam identifier, wherein different search sections in the plurality of search sections correspond to different types of pilot signals;
    sending, by the network device, the pilot signal;
    receiving, by the network device, a random access preamble from a terminal device; and
    sending, by the network device, a random access response corresponding to the random access preamble to the terminal device, wherein the plurality of search sections comprises a communal search section associated with the random access preamble,
    wherein the determining, by the network device, the pilot signal corresponding to the first search section comprises:

determining, as the pilot signal corresponding to the first search section, a first pilot signal corresponding to the communal search section, wherein the first pilot signal is a signal of a first type;

wherein the first pilot signal being a signal of the first type comprises the first pilot signal being at least one of a synchronization signal, a demodulation pilot of a broadcast channel, or a beam measurement pilot; and wherein before the determining, as the pilot signal corresponding to the first search section, the first pilot signal corresponding to the communal search section, the method further comprises:

determining, by the network device, the first pilot signal based on the random access preamble received from the terminal device and a correspondence between the random access preamble and a sequence of signals of the first type, wherein different random access preambles correspond to different sequences of signals of the first type; or determining, by the network device, the first pilot signal based on a time-frequency resource of the random access preamble received from the terminal device and a correspondence between the time-frequency resource of the random access preamble and a sequence of signals of the first type, wherein different time-frequency resources of different random access preambles correspond to different sequences of signals of the first type.

4. The method according to claim 3, wherein:
the plurality of search sections comprises a user specific search section; and
pilot signals corresponding to the user specific search section are signals of the second type.

5. A communication device, comprising:
a processor, configured to:
determine a pilot signal corresponding to a first search section of a plurality of search sections of a control channel, wherein the pilot signal has a quasi-co-location (QCL) association with a demodulation pilot of a control channel candidate in the first search section, wherein the demodulation pilot of the control channel candidate corresponds to a beam identifier, wherein different search sections in the plurality of search sections correspond to different types of pilot signals; and detect the control channel candidate in the at first search section based on the QCL association between the pilot signal and the demodulation pilot of the control channel candidate in the first search section, wherein a resource location of the control channel candidate is based on the beam identifier, a transmitter, configured to send a random access preamble to a network device; and
a receiver, configured to receive a random access response from the network device that corresponds to the random access preamble, wherein the plurality of search sections comprises a communal search section associated with the random access preamble, wherein the processor is further configured to determine, as the pilot signal corresponding to the first search section, a first pilot signal corresponding to the communal search section, wherein the first pilot signal is a signal of a first type;

wherein the first pilot signal being a signal of the first type comprises the first pilot signal being at least one of a synchronization signal, a demodulation pilot of a broadcast channel, or a beam measurement pilot; and wherein before the processor determines, as the pilot signal corresponding to the first search section, the first pilot signal corresponding to the communal search section associated with the random access preamble, the processor is further configured to:

determine the first pilot signal based on the random access preamble sent by the transmitter and a correspondence between the random access preamble and a sequence of signals of the first type, wherein different random access preambles correspond to different sequences of signals of the first type; or determine the first pilot signal based on a time-frequency resource of the random access preamble sent by the transmitter and a correspondence between the time-frequency resource of the random access preamble and a sequence of signals of the first type, wherein different time-frequency resources of different random access preambles correspond to different sequences of signals of the first type.

6. The device according to claim 5, wherein:
the plurality of search sections comprises a user specific search section; and
pilot signals corresponding to the user specific search section are signals of the second type.

7. A communication device, comprising:
a processor, configured to determine a pilot signal corresponding to a first search section of a plurality of search sections of a control channel, wherein the pilot signal has a quasi-co-location (QCL) association with a demodulation pilot of a control channel candidate in the first search section, wherein the demodulation pilot of the control channel candidate corresponds to a beam identifier, and a resource location of the control channel candidate is based on the beam identifier, wherein different search sections in the plurality of search sections correspond to different types of pilot signals;
a transmitter, configured to send the pilot signal; and
a receiver, configured to receive a random access preamble from a terminal device,
wherein the transmitter is further configured to send a random access response corresponding to the random access preamble to the terminal device, wherein the plurality of search sections comprises a communal search section associated with the random access preamble, wherein the processor is configured to determine, as the pilot signal corresponding to the first search section, a first pilot signal corresponding to the communal search section, wherein the first pilot signal is a signal of a first type, wherein the first pilot signal being a signal of the first type comprises the first pilot signal being at least one of a synchronization signal, a demodulation pilot of a broadcast channel, or a beam measurement pilot, and wherein before the processor determines, as the pilot signal corresponding to the first search section, the first pilot signal corresponding to the communal search section associated with the random access preamble received by the receiver, the processor is further configured to:

determine the first pilot signal based on the random access preamble received by the receiver and a correspondence between the random access preamble and a sequence of signals of the first type, wherein different random access preambles correspond to different sequences of signals of the first type; or determine the first pilot signal based on a time-frequency resource of the random access preamble received by the receiver and a correspondence between the time-frequency resource of the random access preamble and a sequence of signals of the first type, wherein different time-frequency resources of different random access preambles correspond to different sequences of signals of the first type.

8. The device according to claim 7, wherein:

the plurality of search sections comprises a user specific search section; and pilot signals corresponding to the user specific search section are signals of the second type.

\* \* \* \* \*